United States Patent
Andoh et al.

(10) Patent No.: US 8,363,296 B2
(45) Date of Patent: Jan. 29, 2013

(54) OPTICAL SCANNING DEVICE, IMAGE FORMING APPARATUS, MIRROR, HOUSING, MIRROR ATTACHING METHOD, MIRROR ARRANGEMENT ADJUSTING DEVICE, AND MIRROR ARRANGEMENT ADJUSTING METHOD

(75) Inventors: Fumikata Andoh, Kanagawa (JP); Kouji Terasawa, Iwate (JP); Hiroshi Takemoto, Kanagawa (JP); Jun Yoshida, Kanagawa (JP); Mitsuru Nakajima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 424 days.

(21) Appl. No.: 11/866,095

(22) Filed: Oct. 2, 2007

(65) Prior Publication Data

US 2008/0117486 A1    May 22, 2008

(30) Foreign Application Priority Data

Oct. 4, 2006 (JP) ................. 2006-272976
Mar. 23, 2007 (JP) ................. 2007-077762
Jul. 24, 2007 (JP) ................. 2007-192154

(51) Int. Cl.
    *G02B 26/08* (2006.01)
(52) U.S. Cl. .................... 359/196.1; 347/232
(58) Field of Classification Search .... 359/196.1–226.3; 347/232, 233, 256–261
See application file for complete search history.

(56) References Cited

U.S. PATENT DOCUMENTS

| 6,000,784 | A | 12/1999 | Takemoto et al. |
| 6,217,684 | B1 | 4/2001 | Morii et al. |
| 6,224,709 | B1 | 5/2001 | Takemoto et al. |
| 7,199,913 | B2 * | 4/2007 | Nakahata ................. 359/205.1 |
| 2005/0280879 | A1 * | 12/2005 | Gibson et al. ............. 358/474 |
| 2006/0164504 | A1 * | 7/2006 | Kobayashi et al. ......... 347/233 |

FOREIGN PATENT DOCUMENTS

| CN | 2479530 Y | 2/2002 |
| JP | 58-103909 | 6/1983 |
| JP | 59-123822 | 8/1984 |

(Continued)

OTHER PUBLICATIONS

U.S. Appl. No. 12/256,991, filed Oct. 23, 2008, Andoh, et al.

(Continued)

*Primary Examiner* — Jennifer L. Doak
(74) *Attorney, Agent, or Firm* — Oblon, Spivak, McClelland, Maier & Neustadt, L.L.P.

(57) ABSTRACT

An optical scanning device configured to irradiate an object with light generating from a light source via at least one mirror with a first end portion and second end portion which are attached to a housing and to scan the object with the irradiating light is provided, wherein the first end portion of the at least one mirror is movably supported by the housing and the second end portion of the at least one mirror is bonded to the housing.

7 Claims, 23 Drawing Sheets

FOREIGN PATENT DOCUMENTS

| | | |
|---|---|---|
| JP | 60-31406 | 3/1985 |
| JP | 60-118014 | 8/1985 |
| JP | 11-231242 | 8/1999 |
| JP | 2000-347013 | 12/2000 |
| JP | 2001-100135 | 4/2001 |
| JP | 2002-116399 | 4/2002 |
| JP | 3348138 | 9/2002 |
| JP | 3352257 | 9/2002 |
| JP | 2002-311368 | 10/2002 |
| JP | 2003-121774 | 4/2003 |
| JP | 2003-188459 | 7/2003 |
| JP | 2003-207611 | 7/2003 |
| JP | 2005-70190 | 3/2005 |
| JP | 2006-17947 | 1/2006 |

OTHER PUBLICATIONS

Office Action issued Apr. 20, 2011, in China Patent Application No. 200710181132.9 (with English translation).

Japanese Office Action issued Mar. 27, 2012 in patent application No. 2007-192154.

* cited by examiner

107

OPTICAL SCANNING DEVICE, IMAGE FORMING APPARATUS, MIRROR, HOUSING, MIRROR ATTACHING METHOD, MIRROR ARRANGEMENT ADJUSTING DEVICE, AND MIRROR ARRANGEMENT ADJUSTING METHOD

BACKGROUND OF THE INVENTION

1. Field of the Invention

The present invention relates to an optical scanning device, an image forming apparatus, a mirror, a housing, a mirror attaching method, a mirror arrangement adjusting device, and a mirror arrangement adjusting method.

2. Description of the Related Art

For a color image forming apparatus such as a laser printer, a digital copying machine and a laser FAX, there are provided a polygon mirror for deflecting a scanning light beam from a light source and formed into a regular polygon shape and optical elements (a scanning lens and a mirror) for imaging the scanning light beam deflected by the polygon mirror on a surface of a photoconductor, and a photosensor is provided outside an effective light exposure area at the side of starting scan in order to determine a writing start position.

In such a color image forming apparatus, it is necessary to superpose plural colors when a color image is formed. There are provided a method for superposing images with plural colors on one photoconductor and a method for superposing images with plural colors on plural photoconductors.

However, tilt of a scanning line in main-scanning directions or a resist deviation in sub-scanning directions may be caused depending on, for example, the field curvature characteristic of an optical element, twisting of an optical housing, thermal deformation caused by heat generation of a polygon motor, thermal deformation caused by a heat source that is another unit in a body, and twisting at the time of attaching a photoconductor, and thereby a color shift is caused in a color image forming apparatus since three or four scanning lines are not superposed.

Main scanning directions are directions in which writing is conducted on a recording medium by an optical scanning device itself, and sub-scanning directions are directions in which a transcription medium is moved, wherein the sub-scanning directions are directions that are generally orthogonal to the main-scanning directions.

The tilt of a scanning line toward sub-scanning directions is a phenomenon such that it is tilted toward the sub-scanning direction with respect to an ideal scanning line. The resist deviation in sub-scanning directions is a phenomenon such that parallel shift is caused to the sub-scanning direction with respect to an ideal scanning line.

Particularly, when both ends of a mirror are fixed by leaf springs, the arrangement of the mirror is fixed and it is difficult to adjust the mirror.

In order to solve this problem, conventional techniques, for example, in Japanese Patent Application Publication No. 2001-100135, are proposed. According to this, one end portion of a mirror in the longitudinal directions thereof is attached to an adjustment mechanism and the other side of the mirror is attached to a mirror support with a holding mechanism. The adjustment mechanism side thereof is supported by an elastic member such as a leaf spring and setting screws for the two-point support thereof while the mirror is clipped. Also, the holding mechanism side thereof is pressed by a mirror fixing member such as a leaf spring onto the supporting point of mirror rotation which is provided in an optical housing so that it is rotatably supported.

As the two setting screws described above are rotated by the same angle, the two setting screws are moved forward or backward by the same extent whereby the mirror is shifted to the sub-scanning direction and the tilt of a scanning line can be controlled. On the other hand, as the two screws are rotated by angles different from each other, the mirror is rotated centered on the supporting point of rotation and the deviation of the scanning positions can be controlled whereby a high-quality color image with a little color shift can be output.

In the above-mentioned conventional technique, although the tilt of a scanning line toward the sub-scanning directions and the resist deviation in the sub-scanning directions can be changed, the adjustment mechanism is complex and the number of components is increased thereby causing a cost increase. An adjustment member such as a setting screw cannot control the positional deviation with a high precision since the resolution in regard to the adjustment precision is low. Also, since the angular rotation of the two setting screws are conducted, it takes a long time to conduct adjustment thereby causing an increase of manpower.

In regard to an optical scanning device, cost reduction by means of simplification of each component, reduction of the number of components, or reduction of a time period required for assembly and adjustment is desired in order to attain a low price of a digital copying machine or a laser printer.

In addition, when both ends of a mirror are fixed by an adhesive material, a mirror and a mirror holding member of an optical scanning device which holds a mirror is thermally expanded or shrunk with a temperature change of the optical scanning device. In general, since the coefficient of linear expansion of a mirror is different from the coefficient of linear expansion of a mirror holding member of an optical scanning device which holds a mirror, the mirror is curved depending on the temperature change of the optical scanning device when both ends of the mirror is rigidly fixed by an adhesive material, and accordingly, the performance of the optical scanning device using a mirror may be degraded. Therefore, for an adhesive material for bonging both ends of a mirror, it is necessary to use a relatively soft adhesive material which can allow for the thermal expansion or shrinkage of a mirror but it may be difficult to bond a mirror rigidly.

In such a situation, the inventors have found that it is possible to provide an optical scanning device which is capable of adjusting arrangement of a mirror and in which a mirror distortion caused by heat is reduced, an image forming apparatus which comprises the optical scanning device, a mirror which is capable of being bonded rigidly and more easily, a housing which is capable of bonding a mirror thereto rigidly, a mirror attaching method which is capable of adjusting arrangement of a mirror and in which a mirror distortion caused by heat is reduced, a mirror arrangement adjusting device which is capable of adjusting arrangement of a mirror more easily, and a mirror arrangement adjusting method which is capable of adjusting arrangement of a mirror more easily.

SUMMARY OF THE INVENTION

According to one aspect of the present invention, there is provided an optical scanning device configured to irradiate an object with light generating from a light source via at least one mirror with a first end portion and second end portion which are attached to a housing and to scan the object with the irradiating light, wherein the first end portion of the at least one mirror is movably supported by the housing and the second end portion of the at least one mirror is bonded to the housing.

According to another aspect of the present invention, there is provided an image forming apparatus configured to form an image by using an optical scanning device, wherein the optical scanning device is an optical scanning device as described above.

According to another aspect of the present invention, there is provided a mirror capable of being bonded by an adhesive material, which has a film configured to improve a bonding power of an adhesive material.

According to another aspect of the present invention, there is provided a mirror configured to be arranged in an optical scanning device, which is provided with a mirror surface portion configured to reflect light and be at a center portion thereof and transmission portions configured to transmit light and be at both end portions thereof, and is capable of being bonded to a housing by an adhesive material.

According to another aspect of the present invention, there is provided a housing of an optical scanning device with a mirror, wherein a bonding part to which a mirror is bonded has a convex-concave form and has a first surface configured to contact a bonding surface of a mirror and a second surface configured to intersect the first surface and form a concave portion, and an intersectional line of the first surface and second surface is generally orthogonal to at least one straight line connecting portions of a bonding surface of a mirror for a housing which portions are most distant from each other.

According to another aspect of the present invention, there is provided a housing of an optical scanning device with a mirror, wherein a bonding part to which a mirror is bonded forms a convex-concave shape by a first surface configured to contact a bonding surface of a mirror and a surface configured to contain a second surface configured to intersect the first surface, and the convex-concave shape has a knurl shape.

According to another aspect of the present invention, there is provided an optical scanning device which has a housing as described above.

According to another aspect of the present invention, there is provided an image forming apparatus wherein an optical scanning device as described above is installed.

According to another aspect of the present invention, there is provided a mirror attaching method configured to attach at least one mirror with a first end portion and a second end portion to a housing of an optical scanning device configured to scan an object with light generating from a light source, wherein the first end portion of the at least one mirror is movably attached to the housing and the second end portion of the at least one mirror is attached to the housing by means of adhesion.

According to another aspect of the present invention, there is provided a mirror attaching method configured to moveably attach a first end portion side of a mirror as described above in longitudinal directions thereof to a housing and attach a second end portion side thereof to a housing by means of adhesion, wherein a position of bonding of a mirror is generally center portion between an end portion of a mirror in longitudinal directions thereof and an end portion of a mirror surface portion which end portions are at a side of the second end portion.

According to another aspect of the present invention, there is provided an optical scanning device wherein a mirror is attached to a housing by a mirror attaching method as described above.

According to another aspect of the present invention, there is provided an image forming apparatus wherein an optical scanning device as described above is installed.

According to another aspect of the present invention, there is provided a mirror arrangement adjusting device configured to adjust arrangement of a mirror attached to a housing of an optical scanning device configured to scan an object with light generating from a light source, which comprises a device configured to rotate the mirror around a first rotational axis of the mirror.

According to another aspect of the present invention, there is provided a mirror arrangement adjusting method configured to adjust arrangement of a mirror attached to a housing of an optical scanning device configured to scan an object with light generating from a light source, which comprises rotating of the mirror around a first rotational axis of the mirror.

DETAILED DESCRIPTION OF THE PREFERRED EMBODIMENTS

Figure 1A:
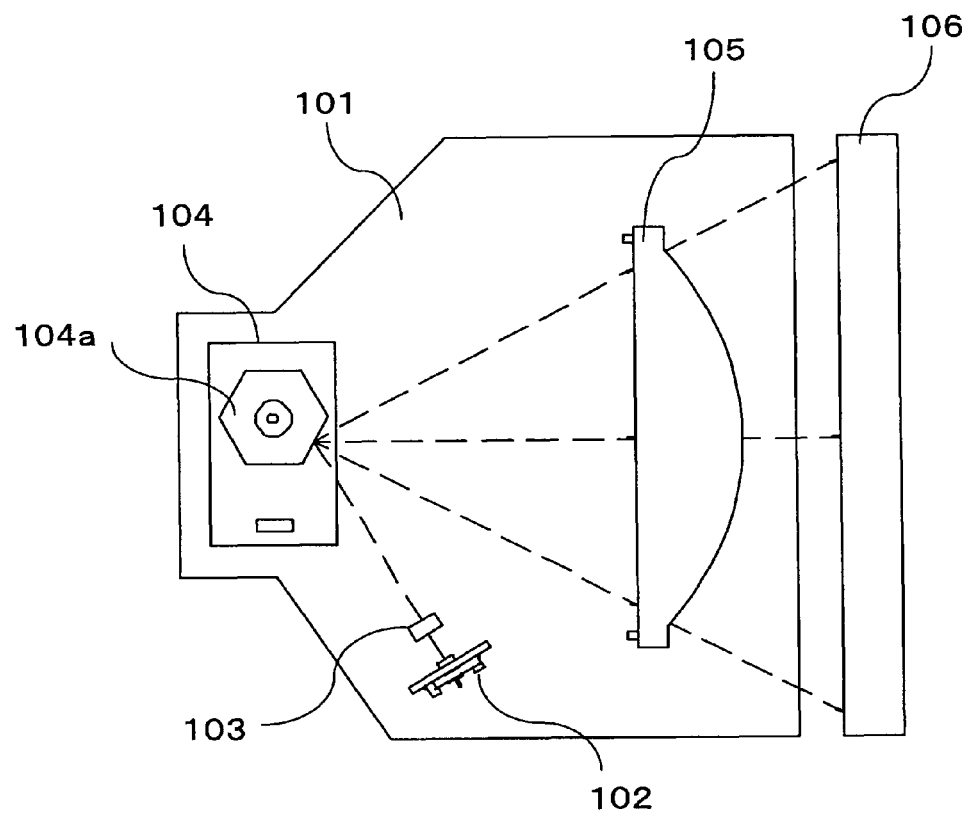
FIGS. 1A and 1B are diagrams showing one example of an optical scanning device on which an embodiment of the present invention is applied.

Next, preferred embodiments of the present invention are described with reference to the drawings.

The first embodiment of the present invention is an optical scanning device which has plural pre-scanning optical systems that are composed of a light source for emitting a light beam, a collimating lens for transforming a divergent beam emitted from the light source into a generally parallel light beam, an aperture for shaping the light beam, and a cylindrical lens for linearly imaging the light beam in main scanning directions, and which is provided with one deflecting part (deflector) for deflecting these light beams from the plural pre-scanning optical systems in the main scanning directions and a single or plural imaging lens groups for imaging the deflected light beams from the pre-scanning optical systems on scanning surfaces, respectively, in one optical housing, wherein plural (folding) mirrors for reflecting and guiding the respective light beams to respective photoconductors are provided such that one end portion of the mirror in the longitudinal directions thereof is fixed by a holding member and the other end portion thereof in the longitudinal directions thereof is fixed by means of adhesion.

The second embodiment of the present invention is the optical scanning device according to the first embodiment of the present invention, wherein one end portion of the mirror is one-point-supported on a semicircular projection formed on the optical housing while it contacts the central portion of the reflection surface side of the mirror in the lateral directions (sub-scanning directions).

The third embodiment of the present invention is an optical scanning device according to the first or second embodiment of the present invention, wherein the one-point supporting part of the one end portion of the mirror is a supporting point while a control of the tilt of a scanning line in the sub-scanning directions by movement of the mirror in directions perpendicular to the reflection surface thereof and a control of the resist thereof in the sub-scanning directions by angular rotation thereof centered on an axis parallel to the reflection surface can be simultaneously conducted.

The fourth embodiment of the present invention is the optical scanning device according to the first or second embodiment of the present invention, wherein the mirror is held by the holding member for holding a mirror by applying loads on the upper left and right sides of a non-reflection surface of the mirror which loads are symmetric with respect to the center of the semicircular projection formed on the optical housing.

The fifth embodiment of the present invention is the optical scanning device according to the fourth embodiment of the present invention, wherein the holding member is a molded elastic body, and desirably, a leaf spring.

The sixth embodiment of the present invention is an optical scanning device according to any of the first to fourth embodiments of the present invention, wherein the mirror is bonded to and fixed on the optical housing at one or two bonding positions of the mirror and optical housing.

The seventh embodiment of the present invention is an optical scanning device according to any of the first to sixth embodiments of the present invention, wherein the mirror is bonded to and fixed on the optical housing by an ultraviolet ray-curable adhesive material, an electron beam-curable adhesive material, or a thermally curable adhesive material.

The eighth embodiment of the present invention is the mirror according to any of the first to seventh embodiments of the present invention, wherein the mirror is provided with a UV transmitting part.

The ninth embodiment of the present invention is the mirror according to the eight embodiment of the present invention, wherein the contact angle (wettability) of a bonding part of the mirror is equal to or less than 45°.

The tenth embodiment of the present invention is a mirror adjusting machine for adjusting the mirror according to the third embodiment, wherein the mirror adjusting machine is provided with a vertical position adjusting mechanism for controlling tilt of a scanning line toward the sub-scanning directions by the movement of the mirror in directions perpendicular to the reflection surface thereof, an angle adjusting mechanism for controlling the resist thereof in the sub-scanning directions by the angular rotation thereof centered on an axis parallel to the reflection surface, and a measurement part for measuring the deviation of the mirror position which is caused by curing and shrinkage of an adhesive material.

The eleventh embodiment of the present invention is a mirror adjusting method for adjusting the mirror according to the third embodiment of the present invention, wherein the deviation of the mirror position which is caused by curing and shrinkage of an adhesive material is controlled to an arbitrary value based on a measurement of the thickness of an adhesive layer between the mirror and the optical housing.

The twelfth embodiment of the present invention is an image forming apparatus in which the optical scanning device according to any of the first to eleventh embodiment of the present invention is installed.

The thirteenth embodiment of the present invention is a mirror bonding and fixing method for controlling curing shrinkage of an adhesive material in the directions of the thickness thereof which bonds and fixes a mirror and a housing in an optical scanning device which has plural pre-scanning optical systems that are composed of a light source for emitting a light beam, a collimating lens for transforming a divergent beam emitted from the light source into a generally parallel light beam, an aperture for shaping the light beam, and a cylindrical lens for linearly imaging the light beam in main scanning directions, and which is provided with one deflecting part (deflector) for deflecting these light beams from the plural pre-scanning optical systems in the main scanning directions, a single or plural imaging lens groups for imaging the deflected light beams from the pre-scanning optical systems on scanning surfaces, respectively, and plural mirrors for reflecting and guiding the respective light beams to respective photoconductors, in one optical housing, wherein one end portion of the mirror in the longitudinal directions thereof is fixed by a holding member and the other end portion thereof in the longitudinal directions thereof is fixed by means of adhesion.

The fourteenth embodiment of the present invention is the mirror bonding and fixing method according to the thirteenth embodiment of the present invention, wherein the curing shrinkage of an adhesive material for the bonding and fixation in the directions of the thickness thereof is controlled by light irradiation in directions perpendicular to the directions of the thickness of the adhesive material.

The fifteenth embodiment of the present invention is a mirror bonding and fixing method according to the thirteenth or fourteenth embodiment of the present invention, wherein the mirror is bonded to and fixed on the optical housing by an ultraviolet ray-curable adhesive material, an electron beam-curable adhesive material, or a thermally curable adhesive material.

The sixteenth embodiment of the present invention is a mirror binding and fixing method according to the fourteenth embodiment of the present invention, wherein an ultraviolet ray (UV) is used as the light in the perpendicular directions.

The seventeenth embodiment of the present invention is an image forming apparatus in which the optical scanning device according to any of the thirteenth to sixteenth embodiments of the present invention is installed.

The eighteenth embodiment of the present invention is a mirror arranged by bonding it to an optical scanning device by using an adhesive material, wherein the mirror is provided with a reflection surface portion for reflecting light and a transmission part for transmitting light. The transmission part is allowed to transmit an ultraviolet ray and a bonding surface is formed on the transmission part. The bonding surface is provided as a bonding surface which is a flat surface at the side at which an end portion thereof is smooth and the bonding surface is provided with a bonding enhancement film for improving the bonding power of the mirror. The bonding enhancement film is also a reflection enhancing film for increasing the reflectance of the mirror surface portion.

The nineteenth embodiment of the present invention has the same configuration as the mirror of the nineteenth embodiment, but the bonding enhancement film on the bonding surface has a hydrophilic property and is composed of a film containing a $SiO_2$ layer. Then, the transmission part is provided with an area on which an ultraviolet ray-curable adhesive material is applied and an area on which the hydrophilic property is measured, which is arranged at the side of an end portion of the mirror.

The twentieth embodiment of the present invention is a method for attaching the mirror according to the eighteenth or nineteenth embodiment to a housing. The first end portion side of the mirror in the longitudinal directions thereof is movably attached to the housing and the second end portion side thereof is attached to the housing by means of adhesion. Then, the bonding position of the mirror is generally the central portion between an end portion of the mirror in the longitudinal directions at the side of the second end portion and an end portion of the reflection surface part. In regard to the adhesion, an adhesive material is applied on one or two bonding positions.

The twenty-first embodiment of the present invention is an optical scanning device in which a mirror is attached by the method for attaching a mirror to a housing according to the twentieth embodiment of the present invention.

The twenty-second embodiment of the present invention is an image forming apparatus provided with the optical scanning device according to the twenty-first embodiment.

The twenty-third embodiment of the present invention is a housing for an optical scanning device with a mirror, wherein the bonging part for bonding a mirror has a convex-concave shape and has a first surface contacting the bonding surface of the mirror and a second surface whose intersection line with the first surface is generally orthogonal to at least one straight line connecting portions on the bonding surface of the mirror and housing which portions are most distant from each other. The second surface has an inclination angle of 30 to 90 degrees with respect to the first surface and the depths of concave portions are uniform.

The twenty-fourth embodiment of the present invention is a particular example of the twenty-third embodiment, wherein the convex-concave structure has a knurl shape such that the convex-concave shape thereof has intersection on the bonding surface.

The twenty-fifth embodiment of the present invention is an optical scanning device having the housing according to any of the twenty-second to twenty-fourth embodiments.

The twenty-sixth embodiment of the present invention is an image forming apparatus in which the optical scanning device according to the twenty-fifth embodiment is installed.

In regard to the first or second embodiment of the present invention or any of the fourth to eighth embodiments of the present invention, one end portion of a mirror in the longitudinal directions thereof is fixed on a semicircular projection formed on an optical housing by using a holding member on the condition that the central portion of the mirror at the reflection surface side in the lateral directions thereof (sub-scanning directions) contacts and is supported by one point and the other end portion thereof in the longitudinal directions thereof is bonded to and fixed on the optical housing at one or two bonding positions by using an ultraviolet ray-curable adhesive material, an electron beam-curable adhesive material or a thermally curable adhesive material, whereby the assemble and positional adjustment are simpler than the conventional techniques so as to expect the reduction of the production cost, while the mirror is provided with a UV transmission part whereby an optical scanning device can be provided which is inexpensive and highly precise without complicating the structure or mechanism of the device or components thereof.

In regard to the third embodiment of the present invention, the one-point-supporting part of one end portion of the mirror is a supporting point and a control of the tilt of a scanning line toward the sub-scanning directions by movement of the mirror in directions perpendicular to the reflection surface thereof and a control of the resist thereof in the sub-scanning directions thereof by the angular rotation thereof centered on an axis parallel to the reflection surface can be conducted simultaneously, whereby a time period for the adjustment and assembly thereof such as positional alignment can be reduced, and accordingly, an inexpensive and highly precise an optical scanning device can be provided.

In regard to the ninth embodiment of the present invention, the contact angle (wettability) of the bonding part of the mirror is equal to or less than 45° whereby an adhesive material wets and spreads on the bonding part of the mirror well so as to obtain the strength of rigid bonding after curing the adhesive material. As a result, a highly precise optical scanning device can be provided which is resistant to an environmental change such as heat and an impact and whose optical property can be stable.

In regard to the tenth or eleventh embodiment of the present invention, a mirror adjusting machine is provided a vertical position adjusting mechanism for controlling tilt of a scanning line toward the sub-scanning directions by the movement of the mirror in directions perpendicular to the reflection surface thereof, an angle adjusting mechanism for controlling the resist thereof in the sub-scanning directions by the angular rotation thereof centered on an axis parallel to the reflection surface, and a measurement part for measuring the deviation of the mirror position which is caused by curing and shrinkage of an adhesive material, whereby the tilt of a scanning line in the sub-scanning directions and the resist thereof in the sub-scanning directions can be controlled simultaneously so as to expect reduction of the production cost while an inexpensive and highly precise optical scanning device can be provided without complicating the structure or mechanism of the device or components thereof.

Also, the measurement part for measuring the deviation of the mirror position which is caused by curing and shrinkage of an adhesive material is provided whereby the thickness of an adhesive layer between the mirror and the housing can be measured for controlling the deviation of the mirror position to an arbitrary value which deviation is caused by curing and shrinkage of an adhesive material so as to provide a highly precise optical scanning device.

In regard to the twelfth embodiment of the present invention, a high-quality image can be obtained by an image forming apparatus in which the optical scanning device according to the preferred embodiment of the present invention is installed.

In regard to the thirteenth or fourteenth embodiment of the present invention, the curing shrinkage of an adhesive material for the bonding and fixing a mirror and an optical housing, in the directions of the thickness thereof is controlled by light irradiation in directions perpendicular to the directions of the thickness of the adhesive material, whereby the orientation of the mirror can be stable after the curing shrinkage of the adhesive material and an optical property thereof can be stable. Also, since the structure or mechanism of the device or components thereof is not complicated, an inexpensive and highly precise optical scanning device can be provided.

In regard to the fifteenth or sixteenth embodiment of the present invention, the bonding fixation of the mirror is conducted by an ultraviolet ray-curable adhesive material, an electron beam-curable adhesive material or a thermally curable adhesive material, whereby a little positional deviation is provided in the bonding fixation and a time period required for adjustment and assembly such as positional alignment can be reduced so as to provide an inexpensive and highly precise optical scanning device.

In regard to the seventeenth embodiment of the present invention, a high-quality image can be obtained by an image forming apparatus in which the optical scanning device according to the preferred embodiment of the present invention is installed.

Next, more specific examples of an embodiment of the present invention are described with reference to the drawings.

Figure 1B:
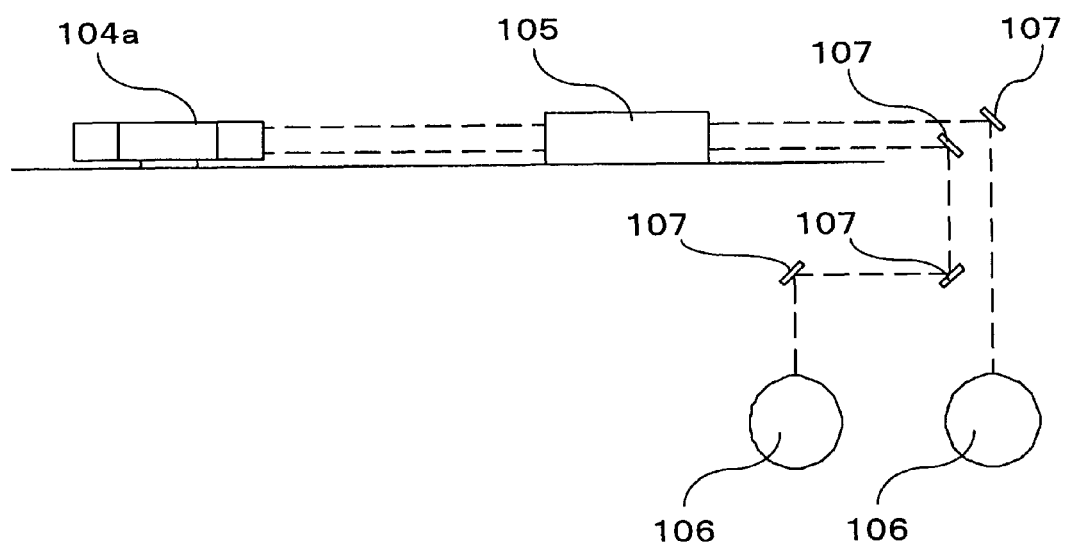

First, two optical scanning devices which are objects of an embodiment of the present invention are described. FIGS. 1A and 1B are diagrams showing one example of an optical scanning device on which an embodiment of the present invention is applied. FIG. 1A is a plan view of one example of an optical scanning device on which an embodiment of the present invention is applied and FIG. 1B is an elevation view of one example of an optical scanning device on which an embodiment of the present invention is applied.

Figure 2A:
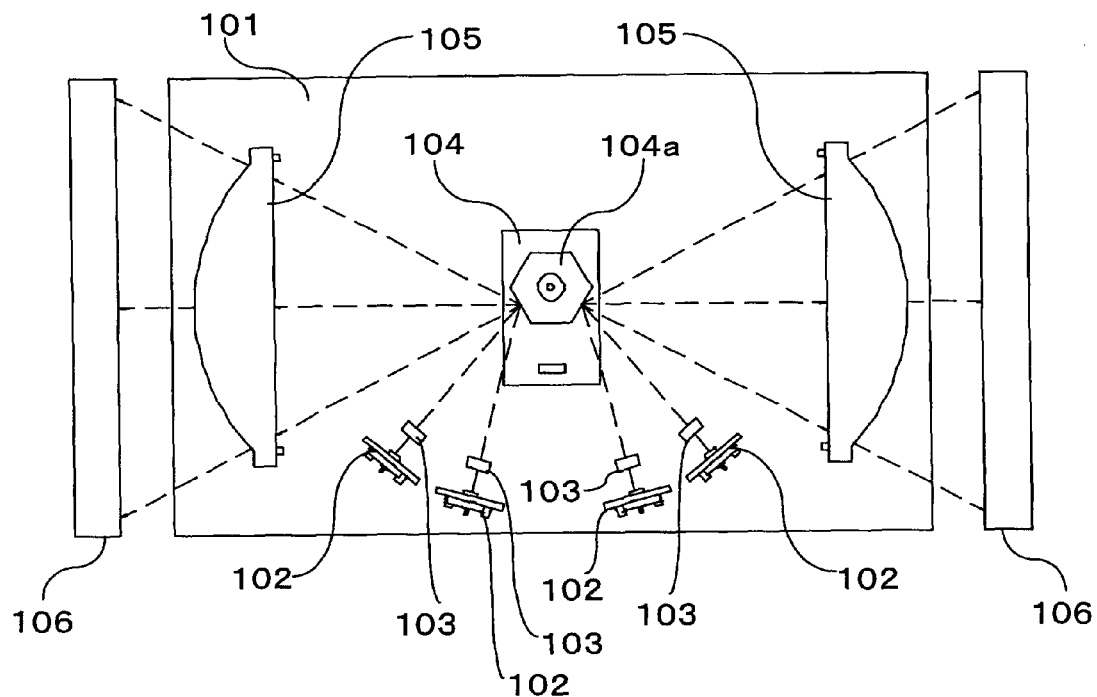
FIGS. 2A and 2B are diagrams showing another example of an optical scanning device on which an embodiment of the present invention is applied.
Figure 2B:
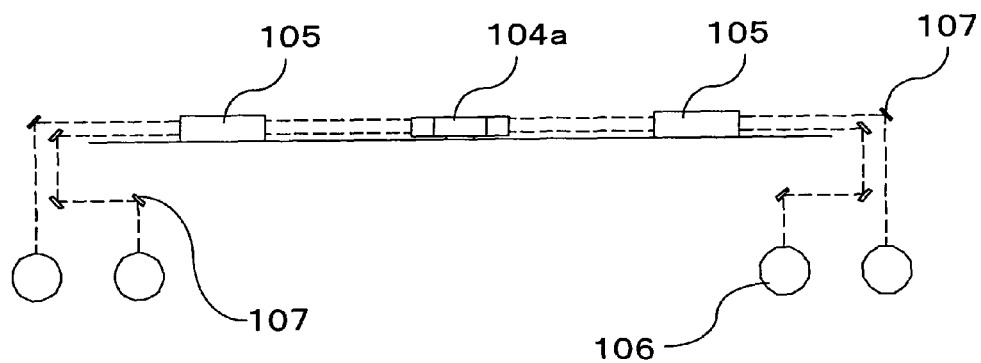

FIGS. 2A and 2B are diagrams showing another example of an optical scanning device on which an embodiment of the present invention is applied. FIG. 2A is a plan view of another example of an optical scanning device on which an embodiment of the present invention is applied and FIG. 2B is an elevation view of another example of an optical scanning device on which an embodiment of the present invention is applied.

One is optical scanning device as shown in FIGS. 1A and 1B, in which a light source 102 for emitting a light beam and a cylindrical lens 103 are provided in an optical housing 101 made of a resin and the light beam emitted from the light source 102 is condensed on a polygon scanner unit 104 which is a deflector. A rotary polygon mirror 104a mounted on the polygon scanner unit 104 deflects the laser light at a uniform angular velocity. Then, the light beam deflected by the polygon scanner unit 104 and transmitting through an optical element 105 is folded by a (folding) mirror 107 so as to be imaged on a photoconductor 106 outside the optical housing 101 and to conduct scanning at a uniform velocity. Also, the number of a semiconductor laser(s) provided for the light source 102 is not limited to one and may be two or more.

The other is an optical scanning device as shown in FIGS. 2A and 2B and intended to form a multi-color image, wherein light beams emitted from plural light sources 102 are deflected by one polygon scanner unit 104 and the light beams transmitting through optical elements 105 which are arranged to correspond to each light source 102 and correspond to the polygon scanner unit 104 are folded by mirrors 107 provided to correspond to the respective light beams, are imaged on photoconductors 106 outside an optical housing 101 and conduct scanning at a uniform velocity. Also, the number of a semiconductor laser(s) provided for the light source 102 is not limited to one and may be two or more.

Next, an optical scanning device according to an embodiment of the present invention is described.

First, practical examples of an optical scanning device according to any of the first to seventh embodiments of the present invention and a mirror according to the eighth or ninth embodiment of the present invention are descried with reference to FIGS. 3, 4A, 4B, 5, 6A, and 6B.

Figure 3:
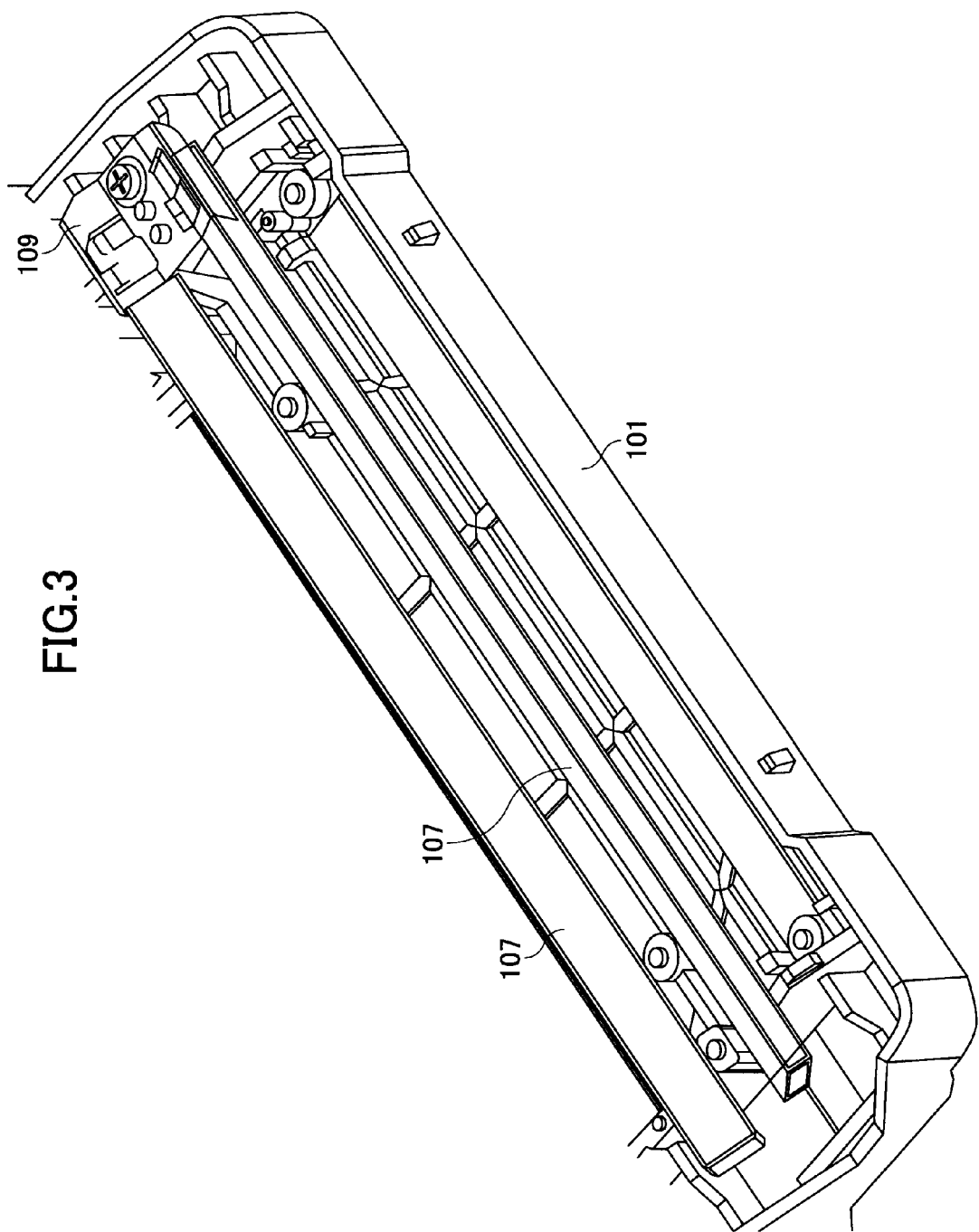
FIG. 3 is a diagram showing an example of a mirror part in an optical scanning device according to an embodiment of the present invention.
Figure 4A:
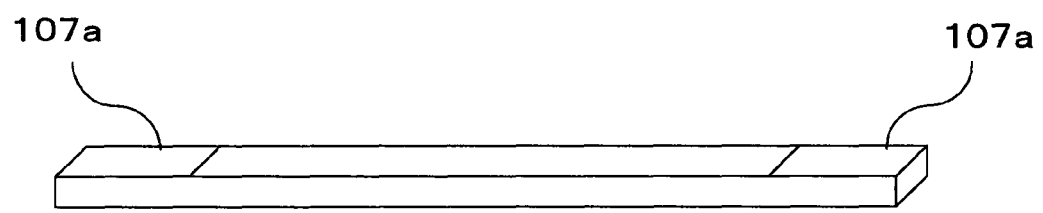
FIGS. 4A and 4B are diagrams showing an example of a mirror according to an embodiment of the present invention.
Figure 4B:
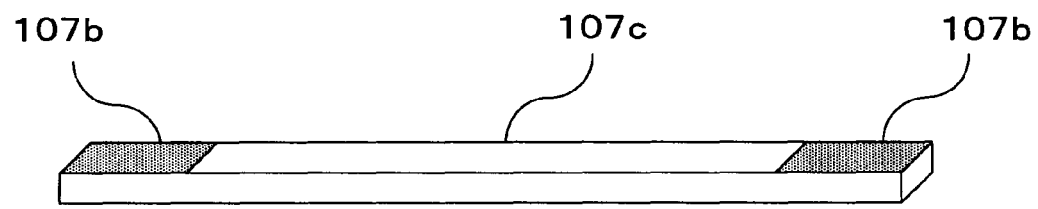
Figure 5:
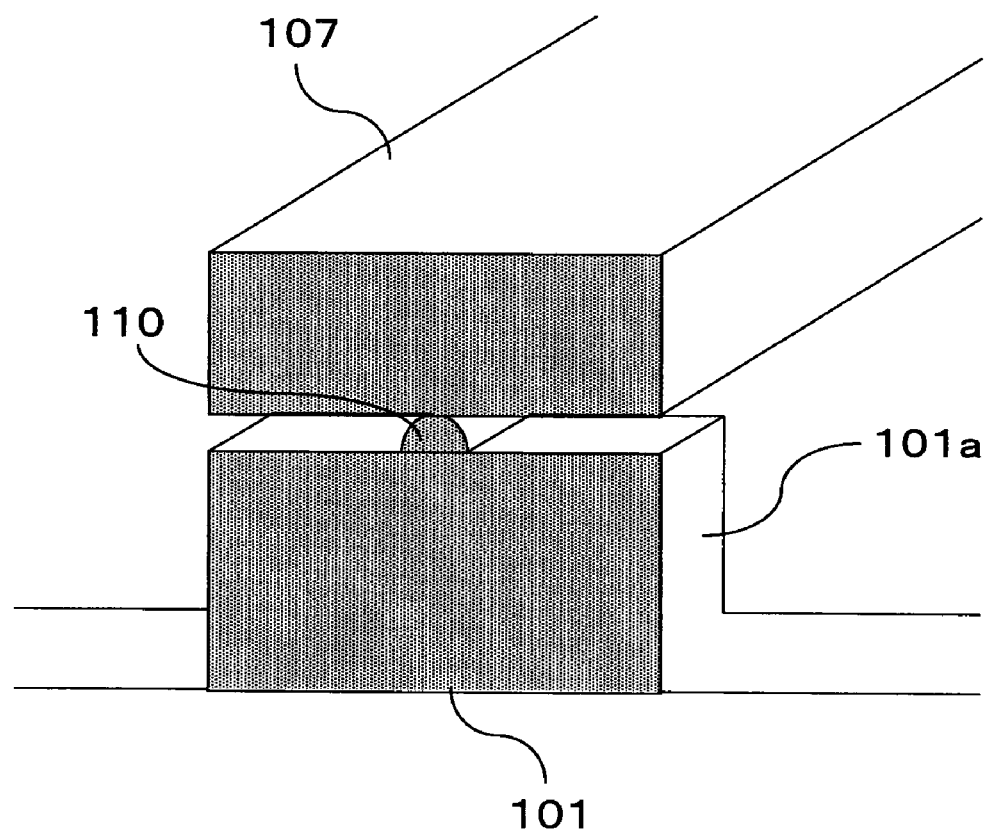
FIG. 5 is a diagram showing an example of a supporting part of an optical scanning device which supports a mirror according to an embodiment of the present invention.
Figure 6A:
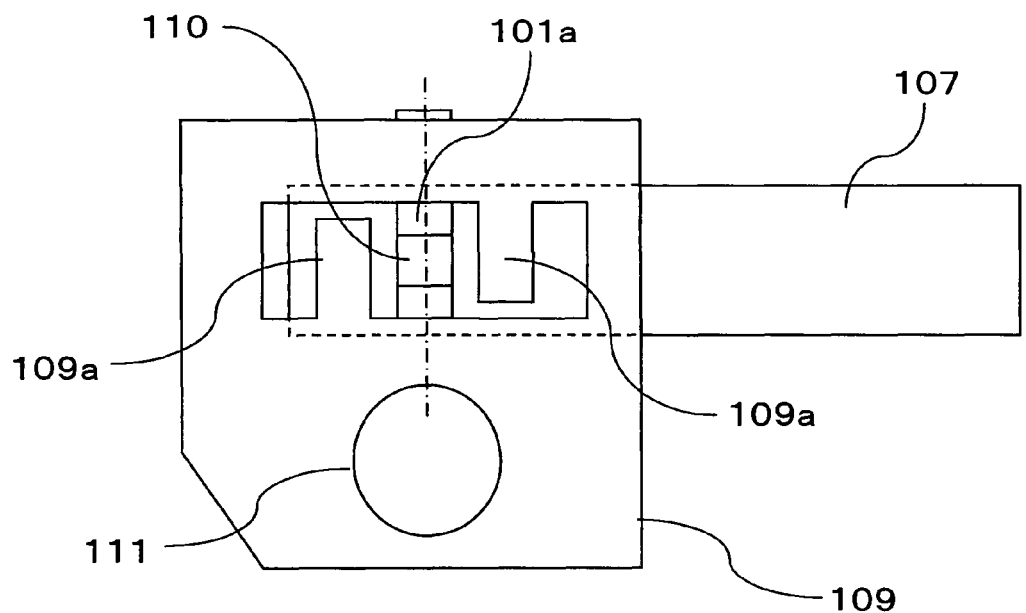
FIGS. 6A and 6B are diagrams showing an example of a holding member of an optical scanning device which holds a mirror according to an embodiment of the present invention.
Figure 6B:
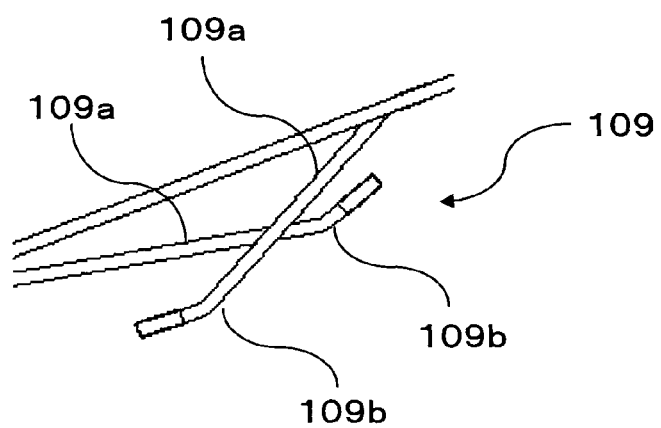

FIG. 3 is a diagram showing an example of a mirror part in an optical scanning device according to an embodiment of the present invention. FIGS. 4A and 4B are diagrams showing an example of a mirror according to an embodiment of the present invention. FIG. 4A is a plan view of the example of a mirror according to an embodiment of the present invention and FIG. 4B is a bottom view of the example of a mirror according to an embodiment of the present invention. FIG. 5 is a diagram showing an example of a supporting part in an optical scanning device which supports a mirror according to an embodiment of the present invention. FIGS. 6A and 6B are diagrams showing an example of a holding member in an optical scanning device which holds a mirror according to an embodiment of the present invention. FIG. 6A is a plan view of the example of a holding member in an optical scanning device which holds a mirror according to an embodiment of the present invention and FIG. 6B is an elevation view of the example of a holding member in an optical scanning device which holds a mirror according to an embodiment of the present invention.

A mirror 107 has a rectangular shape and is composed of a flat member which is long in main scanning directions. Both end portions thereof at the top surface thereof in the longitudinal directions thereof are UV transmission parts 107a for transmitting UV light and for bonding fixation. The flat member for the mirror 107 is not particularly limited if it is a glass member, and preferably, is made of a glass with a high UV transmittance. As a glass with a high UV transmittance, a float glass (blue plate glass) can be provided. When the flat member for the mirror 107 is made of a glass with a high UV transmittance, it becomes possible to cure a UV curable adhesive material more effectively which is provided on a surface at the back side of the UV transmission part 107a.

A mirror surface 107c which is a surface for reflecting light is provided at the side of lower surface. On the mirror surface 107c, for example, a thin film of a metal such as aluminum or an alloy is formed.

Also, both end portions thereof at the side of lower surface in the longitudinal directions are bonding surfaces 107b which sandwiches the mirror surface 107c. Herein, the bonding surface 107b is provided with a bonding enhancement film for applying a UV curable adhesive material more easily and improving the bonding power of the bonding surface 107b of the mirror 107. The bonding enhancement film may be a single-layer film or a multi-layer film and the top layer of the binding enhancement layer may be, for example, $SiO_2$ layer. Also, the bonding enhancement film is provided not only on the bonding surface 107b but also over the mirror surface 107c. When the bonding enhancement film is also provided on the mirror surface 107c, it is preferable that the bonding enhancement film is a reflection improving film for increasing the reflectance of the mirror surface. As a reflection improving film, for example, a multi-layer film such as a three-layer film of $SiO_2$—$TiO_2$—$SiO_2$ can be provided.

Additionally, the mirror 107 can be obtained by, for example, providing a metal or alloy film on the mirror surface 107c of the flat member and providing a bonding enhancement film on, at least, the bonding surface 107b of the flat member, by means of vacuum deposition.

One end portion of the mirror 107 in the longitudinal directions thereof has a configuration such that a holding member 109 can be attached to it and the other end portion has a structure it can be fixed on the optical housing 101 by means of adhesion. When the mirror 107 is supported at three points, the end portion of the mirror 107 which is supported at two points is bonded to the optical housing 101 by adhesive material and the end portion of the mirror 107 which is supported at one point is movably attached to the optical housing 101 by the holding member 109. These are described with reference to FIGS. 5, 6A and 6B.

As shown in FIG. 5, one end portion of the mirror in the longitudinal directions contacts a semicircular supporting part 110 formed on a rib 101a at the side of the upper surface thereof which is provided in the optical housing 101 and there is provided a mechanism for attaching the holding member 109 to the mirror 107 at the side of the upper surface thereof by using a fastening member 111 such as a screw.

As shown in FIG. 6A, two pressurizing parts 109a having a rectangular shape at the central portion and a hole having a circular shape for fixation with the fastening member 111 are formed on the holding member 109. The pressurizing parts 109a formed on the holding member 109 apply a pressure or loads which is/are symmetric at the left and right positions, from the side of upper surface of the mirror 107 to the supporting part 110 so as to hold the mirror 107. Also, corner parts 109b are provided for the pressurizing parts 109a whereby it becomes possible to apply a more uniform pressure or loads.

Additionally, a holding member 109 may be also attached to the end portion of the mirror 107 which is bonded to the optical housing 101 in order to enhance the fixation of the bonded end portion.

For the other end portion, an adhesive material 112 is applied between the mirror 107 and the optical housing 101. Herein, the adhesive material 112 is provided on the mirror 107 and the optical housing 101 at one or two bonding positions, and after the position of the mirror 107 is adjusted, UV irradiation is provided from the upper side of the UV transmission part 107a so as to conduct the bonding fixation with the optical housing 101.

Thus, one end portion of the mirror 107 is movably attached by the holding member 109 and the other end portion of the mirror 107 is bonded, whereby the arrangement of the mirror 107 can be adjusted and warpage of the mirror 107 due to the thermal expansion or thermal shrinkage of the mirror can be prevented or reduced.

Although the example is described with use of a UV curable adhesive material, it is also possible to conduct the bonding fixation with the optical housing 101 by using an electron beam-curable adhesive material or a thermally curable adhesive material other than ultraviolet ray-curable adhesive materials.

When the mirror 107 is bonded and fixed and if the bonding surface of the mirror lies on the condition of bad wettability, a deficiency may be caused such that the adhesive material does not spread by wetting, and accordingly, a deviation of the mirror position may be caused due to peeling caused by an insufficient strength of bonding or an environmental change such as heat and an impact. However, when the contact angle (wettability) of the bonding part of the mirror 107 is equal to or less than 45°, an adhesive material spreads by wetting and it becomes possible to obtain a good bonding condition after the curing thereof.

Next, practical examples of a mirror adjusting machine according to the tenth embodiment of the present invention and a mirror adjusting method according to the eleventh embodiment of the present invention are described with reference to FIGS. 7, 8, 9, and 10.

Figure 7:
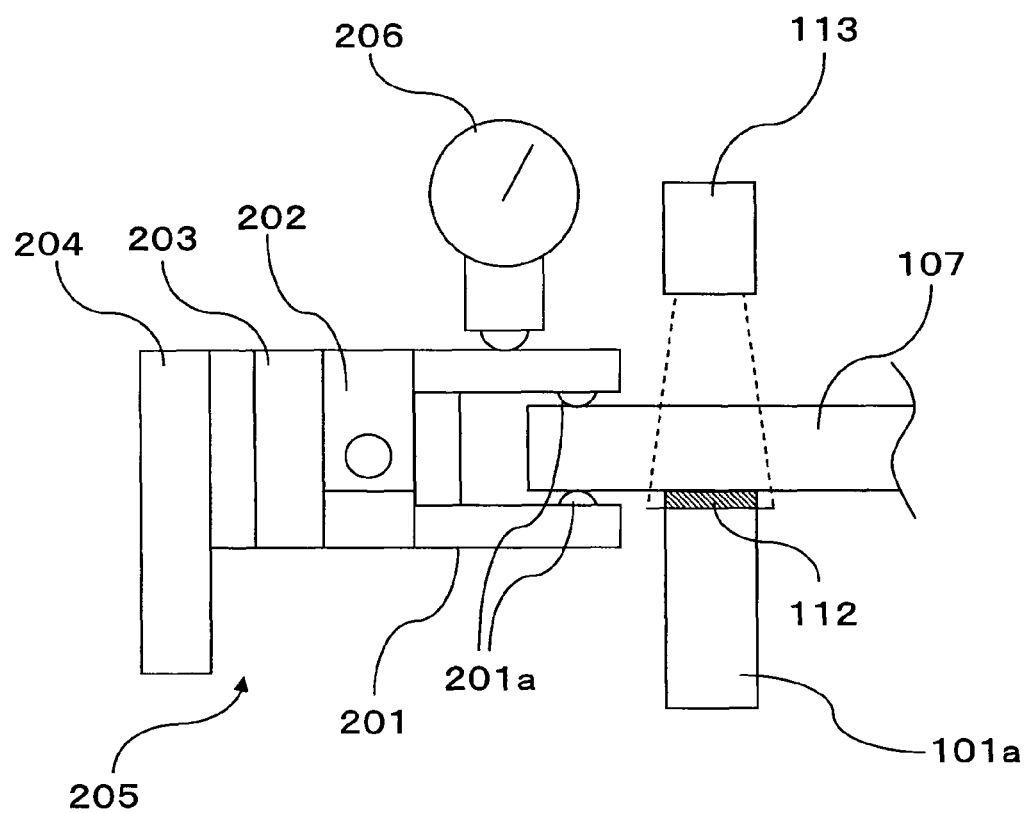
FIG. 7 is a diagram showing the configuration of an example of a mirror adjusting machine according to an embodiment of the present invention.
Figure 8:
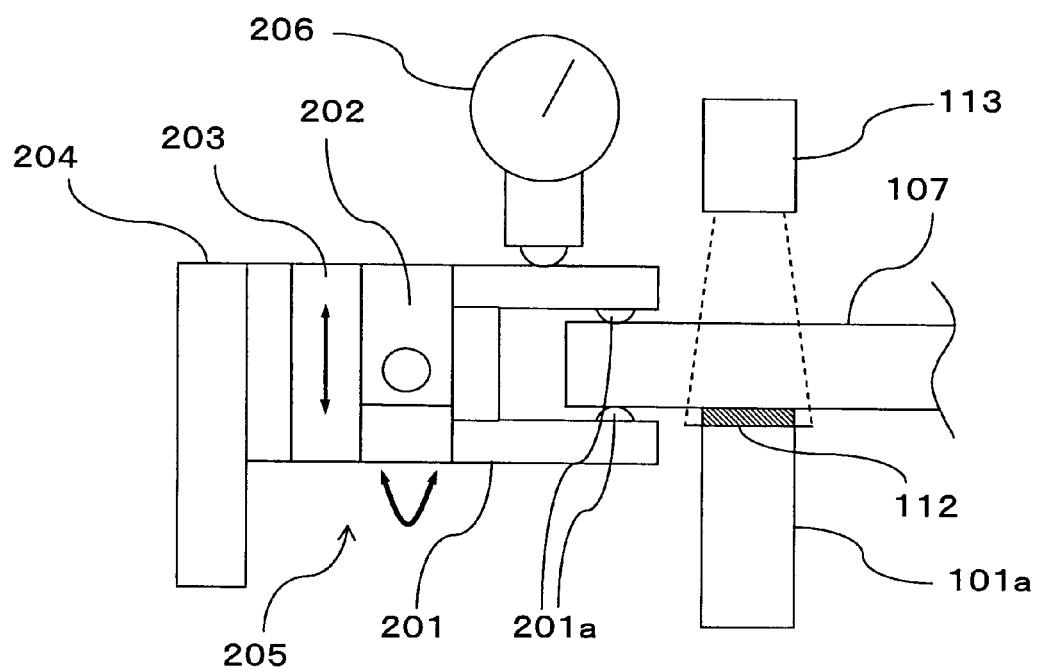
FIG. 8 is a diagram showing an operation of an example of a mirror adjusting machine according to an embodiment of the present invention.
Figure 9:
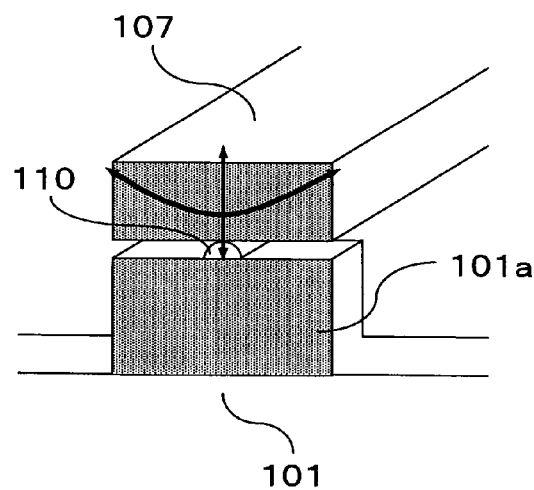
FIG. 9 is a diagram showing adjustment of a mirror in an example of a mirror adjusting machine according to an embodiment of the present invention.
Figure 10:
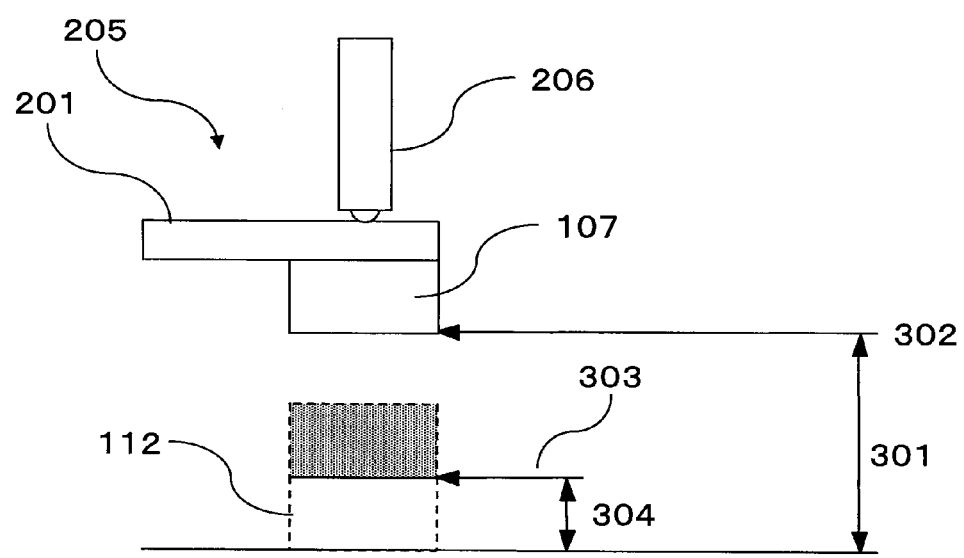
FIG. 10 is a diagram illustrating a method for preventing a deviation of the adjustment position of a mirror in an example of a mirror adjusting machine according to an embodiment of the present invention.

FIG. 7 is a diagram showing the configuration of an example of a mirror adjusting machine according to an embodiment of the present invention. FIG. 8 is a diagram showing the operation of an example of a mirror adjusting machine according to an embodiment of the present invention. FIG. 9 is a diagram showing mirror adjustment in an example of a mirror adjusting machine according to an embodiment of the present invention. FIG. 10 is a diagram showing a method for preventing the deviation of the position of an adjusted mirror in an example of a mirror adjusting machine according to an embodiment of the present invention.

A mirror adjusting machine 205 shown in FIG. 7 is provided with a chuck part 201, an angle adjusting mechanism 202, a vertical position adjusting mechanism 203, an adjusting mechanism holding member 204, a UV light source 113, and a measurement part 206, wherein semi-cylinder-shaped mirror holding parts 201 are formed at the upper side for one-point supporting and at the lower side for two-point supporting on the tip portions of the chuck part 201. Also, the measurement part 206 contacts the side of the upper surface of the chuck part 201 and the UV light source 113 is provided above the mirror.

In the mirror adjusting machine 205, the other end portion of the mirror 107 in the longitudinal directions thereof to which the holding member 109 is not attached is held by a mirror holding part 201a formed on the chuck part 201 while the supper side and lower side of the mirror are supported at one point and two points, respectively.

On the condition that the mirror 107 is held, an adhesive material is applied between the mirror 107 and the upper surface of the rib 101a formed on the optical housing 101.

As shown in FIGS. 8 and 9, the mirror 107 is moved in the vertical directions as indicated by a linear arrow by using the vertical position adjusting mechanism 203 provided in the mirror adjusting machine 205, whereby the supporting part 110 shown in FIG. 9 is a supporting point and the tilt of a scanning line in the sub-scanning directions is controlled by the displacement of the mirror 107 in the direction of the thickness thereof as indicated by a linear arrow in FIG. 8.

Also, the mirror 107 is moved by the angle adjusting mechanism 202 in the horizontal directions in FIG. 9, whereby the supporting part 110 is a supporting point shown in FIG. 9, and the mirror 107 swings or rotates around an axis perpendicular to the surface of the paper sheet in FIG. 9, as indicated by a curved arrow in FIG. 9. Then, as indicated by a curved arrow in FIG. 8, an axis parallel to the surface of the paper sheet in FIG. 8 is a rotational axis and the mirror swings or angularly rotates around the rotational axis so as to control the deviation of the resist in the sub-scanning directions.

Thus, when only the tilt of a scanning line toward the sub-scanning directions is adjusted (the control of the deviation of the resist in the sub-scanning directions is not required), it is only necessary to displace the mirror 107 vertically in the directions of the thickness of the mirror 107. Then, the end portion of the mirror 107 which is held by the holding member 109 is not necessarily supported at one point and may be supported by two or more points or a surface. On the other hand, the mirror 107 is displaced vertically in the directions of the thickness of the mirror 107 and is rotated toward the horizontal directions of the mirror 107 in order to control both the tilt of a scanning line toward and the deviation of the resist in the sub-scanning directions, whereby the end portion of the mirror 107 which is held by the holding member 109 is supported by one point (for example, including one point on a circular arc).

As described above, since the vertical position adjusting mechanism 203 and angle adjusting mechanism 202 provided for the mirror adjusting machine 205 are separate mechanisms, it is possible to control the tilt of a scanning line toward the sub-scanning directions and the resist in the sub-scanning directions simultaneously.

After the tilt of a scanning line toward the sub-scanning directions and the resist in the sub-scanning directions are controlled, an adhesive material is cured by UV light irradiation from a UV light source provided above the upper side of the mirror 107 so that the mirror 107 and the optical housing 101 are bonded and fixed to each other.

However, since the thickness of an adhesive layer changes for every adjustment, a deviation of the position of an adjusted mirror 107 may be caused by curing shrinkage of an adhesive material so that a deviation of the tile of a scanning line toward the sub-scanning directions with respect to a target value of adjustment may be caused. That is, at the time of bonding fixation, the position of the mirror is greatly changed due to the curing shrinkage. When such a change in the mirror position is caused, a scanning line may be tilted so as to provide a color shift in an image evaluation. Therefore, it is necessary to fix the mirror at a target position.

It is very difficult to control the deviation of the position of a mirror 107 which is caused by curing shrinkage of an adhesive material to "0", due to the characteristics of the adhesive material.

Therefore, the degree of curing shrinkage of an adhesive material per the thickness of an adhesive layer is preliminarily obtained and a correction coefficient is calculated in order to control the tilt of a scanning line toward the sub-scanning directions which changes for each adhesive layer to an arbitrary value. The thickness A 304 of an adhesive layer after controlling the tilt of a scanning line toward the sub-scanning directions and the resist in the sub-scanning directions is measured by the measurement part 206 attached to the mirror adjusting machine 205 as shown in FIG. 10. This tilt value (target value) E 303 is multiplied by the correction coefficient for the curing shrinkage of an adhesive material per the thickness of an adhesive layer and a control to an adjustment value C 301 and a tilt value D 302 is conducted so that the deviation of the position of the adjusted mirror 107 which is caused by the curing shrinkage can be prevented.

Alternatively, an adhesive configuration is used such that the curing shrinkage of an adhesive material can be reduced so as to reduce the positional deviation.

Figure 11A:
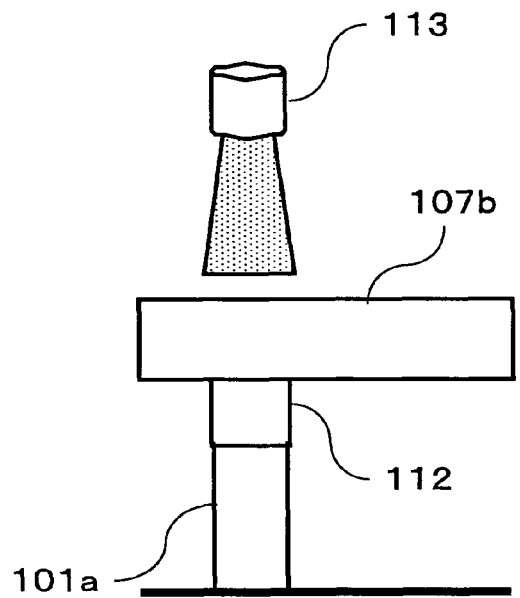
FIGS. 11A and 11B are diagrams illustrating one example of a mirror bonding and fixing method according to an embodiment of the present invention.
Figure 11B:
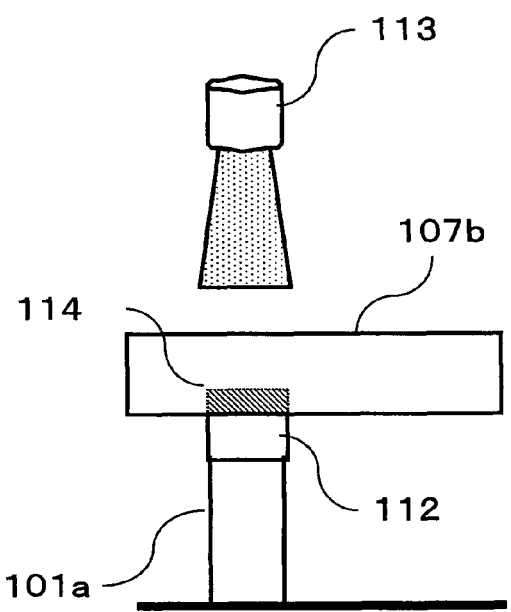

FIGS. 11A and 11B are diagrams illustrating one example of a mirror bonding and fixing method according to an embodiment of the present invention. FIG. 11A is a diagram showing the initial state of one example of a mirror bonding and fixing method according to an embodiment of the present invention and FIG. 11B is a diagram showing the final state of one example of a mirror bonding and fixing method according to an embodiment of the present invention.

In regard to the mirror bonding fixation side of a mirror 107 in the longitudinal directions thereof (the side of a bonding surface 107b of the mirror) as shown in FIG. 11A, the mirror position is changed in the directions of the thickness of the mirror 107 and directions of rotation thereof by a mirror angle adjusting mechanism so as to control the tilt of a scanning line toward the sub-scanning directions or the positional deviation of the resist in the sub-scanning directions.

After the adjustment, as shown in FIG. 11A, the mirror 107 is bonded to and fixed on an optical housing 101 by applying an adhesive material 112 such as ultraviolet ray-curable adhesive materials on the top surface portion of a rib 101a, contacting the mirror 107 with it, and conducting UV light irradiation as energy for curing the adhesive material from the position of ultraviolet ray irradiation of a UV light source 118 set above the upper surface of the mirror 107 (in the directions of the normal line of a bonding surface of the mirror 107).

However, as shown in FIG. 11B, when UV light irradiation is conducted, the adhesive material 112 starts curing from the side of a mirror surface and the position of the mirror 107 changes depending on the degree of curing shrinkage 114 (the rate of deformation of the adhesive material) in the directions of the thickness of the adhesive material 112 (the directions of the normal line of a bonding surface of the mirror 107), whereby a deviation may be caused in the tilt of a scanning line toward the sub-scanning directions or the position of the resist in the sub-scanning directions.

Figure 12A:
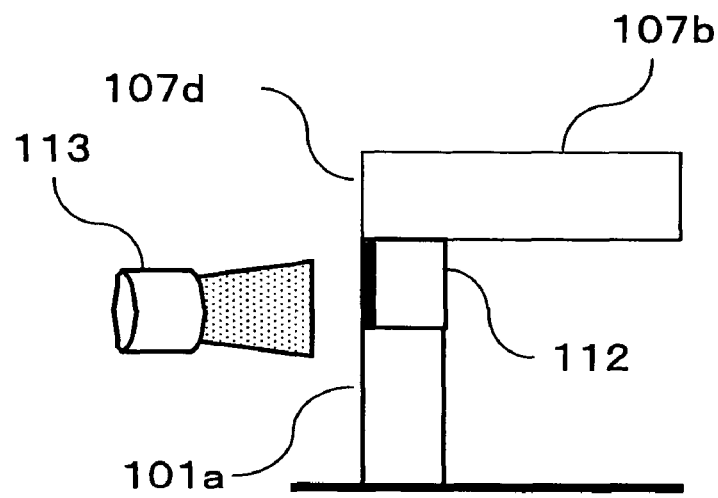
FIGS. 12A and 12B are diagrams illustrating another example of a mirror bonding and fixing method according to an embodiment of the present invention.
Figure 12B:
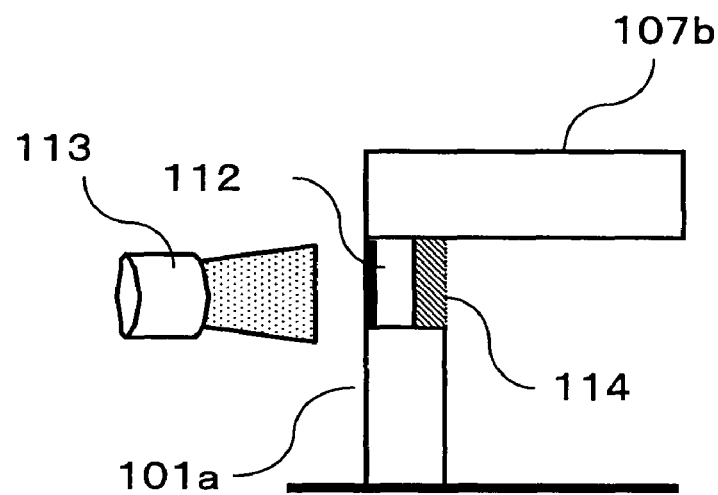

FIGS. 12A and 12B are diagrams illustrating another example of a mirror bonding and fixing method according to an embodiment of the present invention. FIG. 12A is a diagram showing the initial state of another example of a mirror bonding and fixing method according to an embodiment of the present invention and FIG. 12B is a diagram showing the final state of another example of a mirror bonding and fixing method according to an embodiment of the present invention.

After the tilt of a scanning line toward the sub-scanning directions or the positional deviation of the resist in the sub-scanning directions is controlled, an adhesive material 112 such as ultraviolet ray-curable adhesive materials is applied on the top surface of a rib 101a formed on an optical housing 101 and the mirror 107 is contacted with it, as shown in FIG. 12A.

As shown in FIG. 12A, the position of ultraviolet ray irradiation of a UV light source 113 is arranged to be in directions perpendicular to the directions of the thickness of the adhesive material 112 for bonding fixation (or to the directions parallel to a mirror end surface 107d) (or in directions orthogonal to the directions of the normal line of a bonding surface of the mirror 107) and UV light irradiation as energy for curing the adhesive material is conducted from the side surface part lying in the directions of the thickness of the adhesive material 112. As shown in FIG. 12B, the mirror 107 is subjected to curing shrinkage 114 thereof in the longitudinal directions thereof which curing shrinkage starts from the side surface part lying in the directions of the thickness of the adhesive material 112 by conducting the UV light irradiation from the position of ultraviolet rat irradiation of the UV light source 113.

Accordingly, the degree of curing shrinkage 114 in the directions of the thickness of the adhesive material 112 (the rate of deformation of the adhesive material) can be controlled so that the tilt of a scanning line toward the sub-scanning directions or the positional deviation of the resist in the sub-scanning directions which are caused by the curing shrinkage of the adhesive material 112 can be reduced. Although this example is described with use of an ultraviolet ray-curable adhesive material, it is possible to conduct the bonding fixation with the optical housing 101 by using an electron beam-curable adhesive material or a thermally curable adhesive material other than ultraviolet ray-curable adhesive materials.

Figure 13:
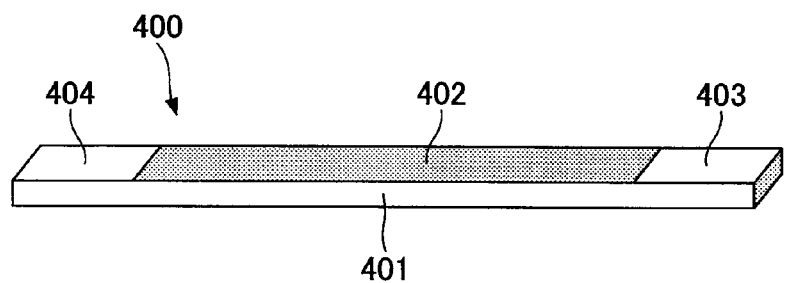
FIG. 13 is a perspective view of a mirror according to an embodiment of the present invention.
Figure 14:
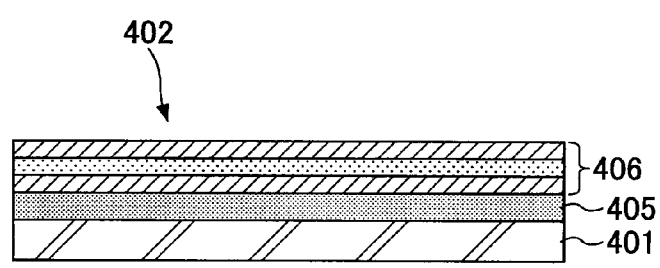
FIG. 14 is the cross section structure of a mirror.
Figure 15:
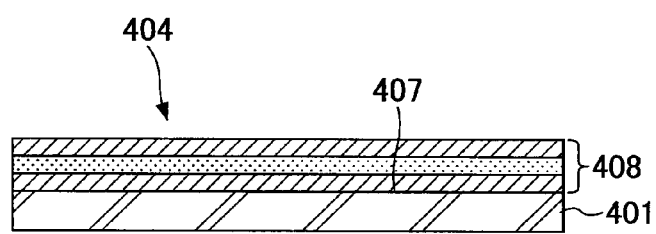
FIG. 15 is a cross section structure of a light transmission part of a mirror.

The eighteenth embodiment of the present invention is a mirror used for an optical scanning device which mirror is shown in FIGS. 13, 14 and 15. The mirror of this embodiment has a configuration such that a mirror surface part 402 for reflecting light and a transmission part 404 for transmitting light are provided on a flat member 401, as shown in FIG. 13. The mirror 400 has a rectangular shape and the longitudinal directions thereof correspond to the main scanning directions of an optical scanning device. The mirror surface part 402 is formed on one side of the surfaces of the flat member 401 near the center thereof and the transmission pats 403, 404 are formed on both end portions thereof in the longitudinal directions. The flat member 401 is not particularly limited if it is a glass member and it is preferable that it is made of a glass with a high UV transmittance.

The cross-sectional structure of a mirror surface part 401 shown in FIG. 14 is composed of a reflection film 405 and a three-layer reflection enhancing film 406. The reflection film 405 is a film for reflecting light and is formed by a thin film of a metal such as aluminum or an alloy on the flat surface of a flat member 401. The reflection enhancing film 406 is a film for increasing the reflectance thereof which is composed of three layers and the reflection enhancing film 406 is formed on the supper side (outer side) of the reflection film 405.

The cross-sectional structure of a transmission part 404 of a mirror shown in FIG. 15 (a transmission part 403 also has the same cross-sectional structure) is a part capable of transmitting an ultraviolet ray and a bonding surface 407 is formed on the transmission part 404 having the same surface as that of the mirror surface part 402 of the mirror 400. On the surface of the bonding surface 407, a bonding enhancement film 408 composed of three layers is provided.

Figure 16A:
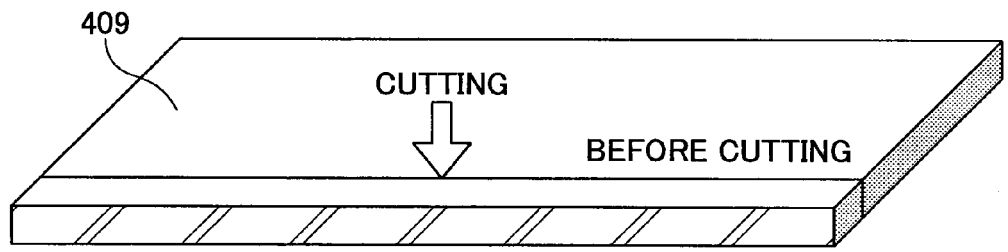
FIGS. 16A, 16B and 16C are diagrams illustrating a manufacture of a planar member.
Figure 16B:
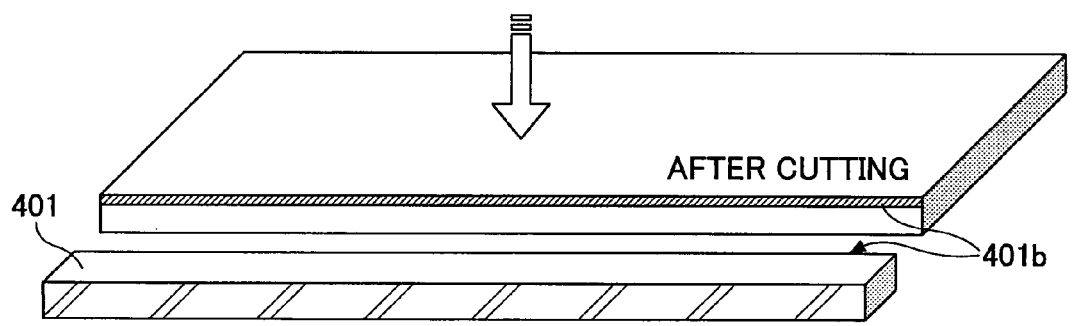
Figure 16C:
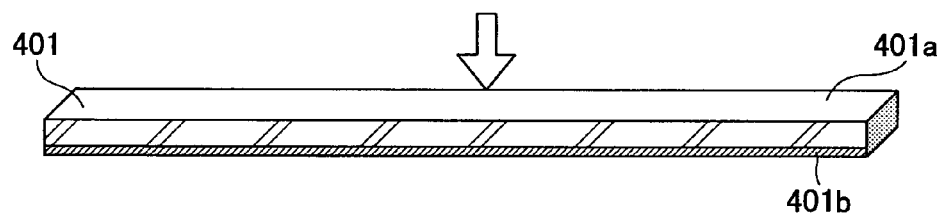

Usually, a flat member 401 is obtained by cutting a large board member 409 into strips, as shown in FIGS. 16A, 16B and 16C. Then, an irregularity having a wave form (usually, called "burr") may be frequently generated at the end portions of the flat member 401 in the lateral directions thereof, which are cut parts. The "burr" 401b tends to be only generated at one cut surface. Since the surface on which the "burr" 401b is generated lacks the smoothness of a surface, it is preferable to select a smooth surface 401a on which the "burr" is not generated for a surface for forming a mirror surface.

It is considered that stress generating at the time of cutting remains and is stored in the portion of "burr" 401b, and there is a possibility such that a crack may be generated in a mirror 400 in use due to a sudden temperature change or a force of curing shrinkage of an adhesive material (tensile stress). Therefore, it is preferable that a mirror surface part 402 and transmission parts 403, 404 are provided on a flat and smooth surface 401a at the opposite side of a flat surface having the "burr" 401b, in order to improve the strength of bonding fixation. In this embodiment, a mirror 404 is provided in which a mirror surface part 402 and transmission parts 403, 404 are formed on a smooth surface 401a at the opposite side of a flat surface having the "burr" 401b.

The attachment of the mirror 404 to an optical housing is described with reference to FIGS. 3 and 5. The mirror 400 is referred to as a mirror 107. The mirror 107 of an optical scanning device which is shown in FIGS. 3 and 5 has a configuration such that one end portion of the mirror in the longitudinal directions thereof is held by a holding member 109 and the other end portion is fixed on an optical housing 101 by means of adhesion. The end portion held by the holding member 109 contacts a supporting part 110 having a semi-cylindrical shape which is formed at the upper surface side of a rib 101a provided on the optical housing 101, as shown in FIG. 5. A mechanism is provided for attaching the holding member 109 to the upper surface side of the mirror 107 by using a fastening member such as a screw.

Figure 17:
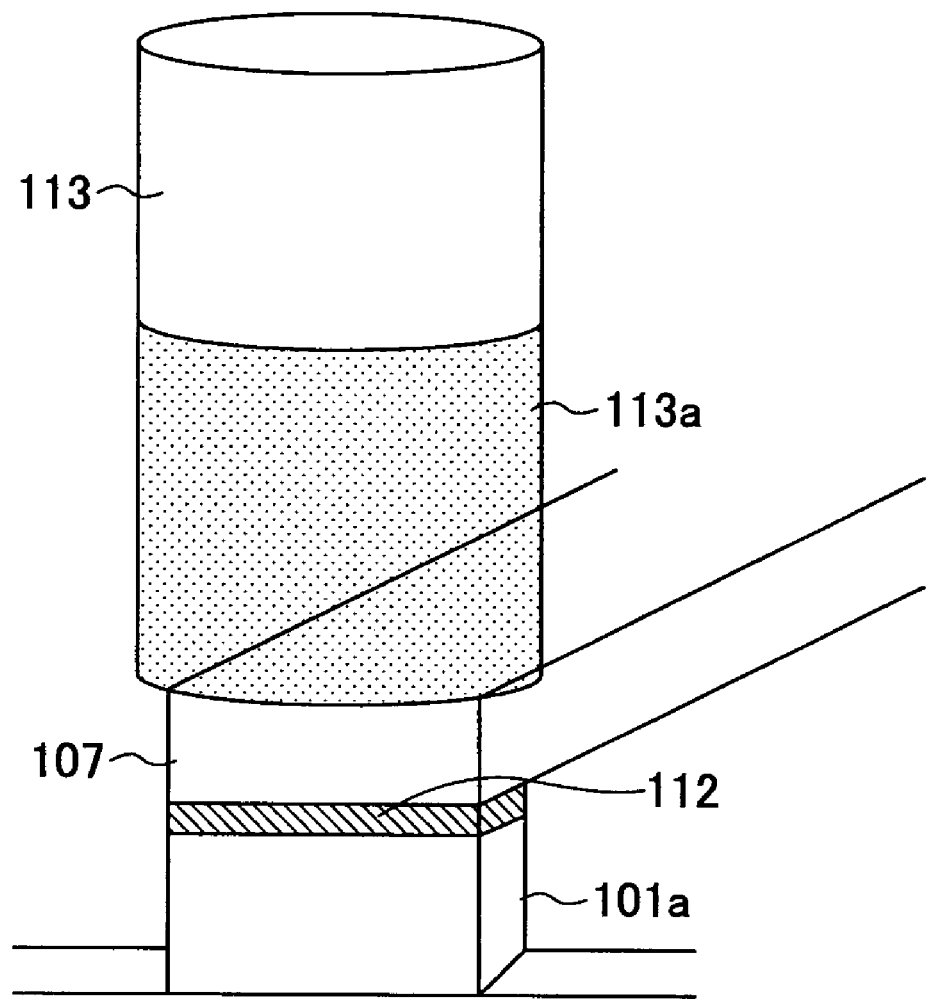
FIG. 17 is a diagram of UV irradiation on an adhesive material.

The other end portion is bonded to and fixed on the rib 101a of the optical housing by applying a UV curable adhesive material 112 between the mirror 107 and the rib 101a of the optical housing and conducting UV irradiation by using a UV light source 113 from the upper side of an ultraviolet ray transmitting part of the mirror 107 after the adjustment of the position thereof, as shown in FIG. 17, so as to conduct bonding fixation with the rib 101a of the optical housing. Although the example of this embodiment is described with use of a UV curable adhesive material, it is also possible to conduct bonding and fixation of the mirror 107 with the optical housing 101 by using an electron beam-curable adhesive material or a thermally curable adhesive material other than ultraviolet ray-curable adhesive materials.

In this embodiment, a UV transmission part is provided on a mirror, whereby an inexpensive and highly precise optical scanning device can be provided without complicating the configuration or mechanism of a device for bonding fixation or components thereof.

The nineteenth embodiment of the present invention is a mirror with a transmission part on which a bonding surface for a bonding enhancement film is formed. FIG. 15 shows a partial cross-section diagram of a mirror in which a bonding surface for a three-layer binding enhancement film 408 is formed on a transmission part 404 of a flat member 401. As shown in FIG. 15, a bonding enhancement film 408 with a high hydrophilic property such as $SiO_2$ film is film-formed on a the surface of a flat member provided for a mirror 400, whereby a bonding surface with a small contact angle, that is, a high hydrophilic property (wettability) is provided as shown in FIG. 20B. On such a bonding surface, a UV curable adhesive material easily spreads by wetting and a high bonding strength can be obtained after curing the adhesive material.

Figure 20A:
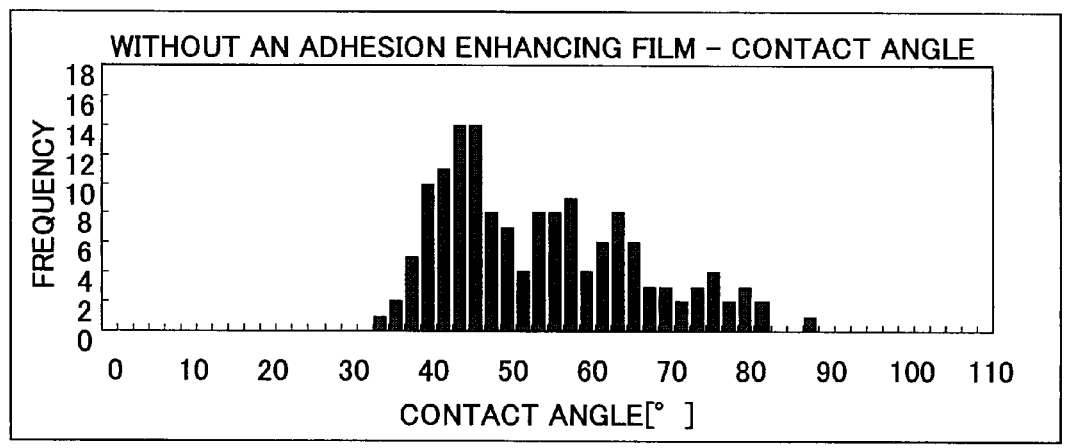
FIGS. 20A and 20B are diagrams showing the variation of a contact angle which is caused by a bonding enhancement film.
Figure 20B:
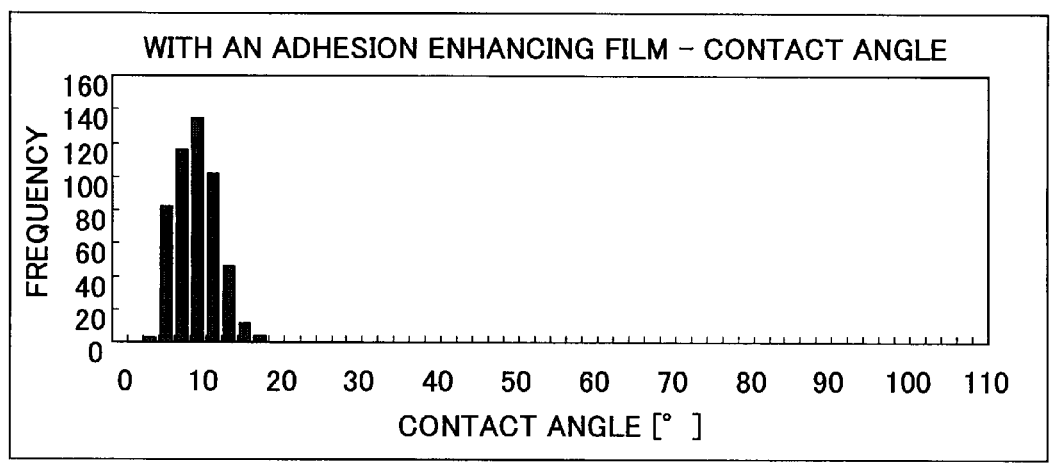

On the other hand, if a UV curable adhesive material is applied on a mirror with a bonding surface having no hydrophilic property so as to conduct bonding fixation, the bonding surface of the mirror may have a contact angle as shown in FIG. 20A. Accordingly, a problem may occur such that a UV curable adhesive material does not sufficiently spread by wetting whereby peeling due to an insufficiency of the bonding strength may be caused, and the positional deviation of the mirror may be caused by the influence of external disturbance such as a temperature change and an impact and vibration.

In this embodiment, as a bonding enhancement film 408, the same one as the reflection enhancing film 406 can be used which is film-formed on the upper side of the reflection film 405 provided on the mirror surface part 402, as shown in FIG. 14. Accordingly, the bonding enhancement film 408 can be film-formed while the reflection enhancing film 406 is film-formed on the mirror surface part 402, in a practical production process.

The binding enhancement film 408 is excellent in the hydrophilic property thereof and the binding strength between the binding enhancement film 408 and the flat member 401 is higher than the bonding strength between a UV curable adhesive material and the flat member 401. Furthermore, a bonding strength which can provide a resistance to a temperature change or the influence of external disturbance such as an impact and vibration can be obtained whereby it is also excellent in a long-term adhesive property with the flat member 401 that is a glass member.

Figure 18:
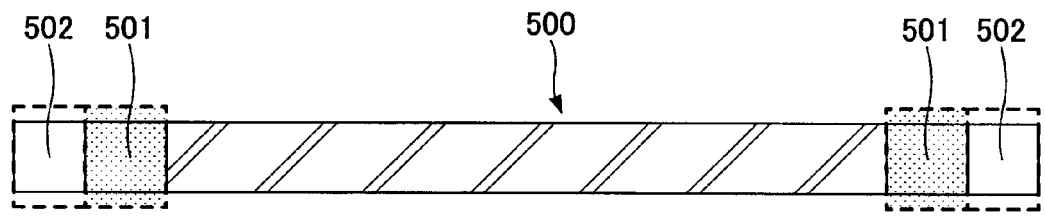
FIG. 18 is a mirror (1) according to an embodiment of the present invention.

In regard to the wettability (hydrophilic property) of a bonding surface on which the film enhancement film 408 is film-formed, a contact angle evaluation method is used which includes dropping of purified water. However, once purified water is wiped which has been dropped on the bonding surface on which the bonding enhancement film 408 is film-formed, a phenomenon may be found such that the wettability of the same bonding surface is subsequently on a bad condition (such that it does not spread by wetting). Therefore, as shown in FIG. 18, the area of a mirror 500 on which the binding enhancement film 408 is film-formed is divided into an area 501 for directly applying a UV curable adhesive material without dropping and wiping purified water and an area 502 for measuring a contact angle (hydrophilic property or wettability) while purified water is dropped, and the contact angle (hydrophilic property or wettability) is measured. Thus, the hydrophilic property (wettability) of the area 501 for applying a UV curable adhesive material can be maintained by providing a contact angle measuring area 502 which is separate from an adhesive material applying area 501.

In this embodiment, a UV curable adhesive material spreads on the bonding part of the mirror well and thereby a high bonding strength can be obtained after curing the adhesive material. As a result, a binding strength can be obtained which provides a resistance to a temperature change or the influence of external disturbance such as an impact and vibration, whereby a mirror for a highly precise optical scanning device that can stabilize the optical characteristics thereof can be provided. Also, the bonding surface of a mirror is provided with an area for applying a UV curable adhesive material and an area for evaluating the contact angle (wettability) thereof, whereby a condition of good wettability (such that it spreads by wetting) can be maintained without degrading the wettability of the area for applying a UV curable adhesive material at the time of measuring a contact angle with dropping of purified water. Moreover, as the area for measuring a contact angle (wettability) is provided at the side of an end portion of the mirror, dropped purified water can be wiped easily. Accordingly, an inexpensive and highly precise optical scanning device can be provided without complicating a device for evaluating a contact angle or the configuration or mechanism of components thereof.

Figure 19:
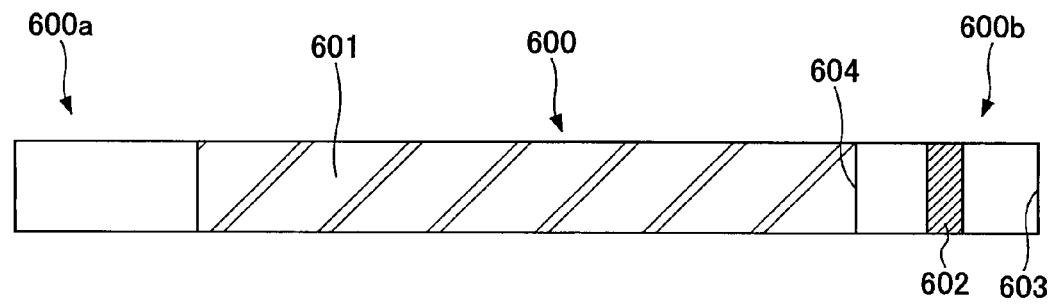
FIG. 19 is a mirror (2) according to an embodiment of the present invention.

The twentieth embodiment of the present invention is a mirror attaching method for movably attaching the first end portion side of a mirror described in the eighteenth or nineteenth embodiment to a housing and attaching the second end portion side thereof to the housing by means of adhesion, wherein the bonding position of the mirror is a generally central part between the second end portion of the mirror in the longitudinal directions thereof and an end portion of the mirror surface part. The bonding power of a reflection film 405 to a flat member 401 which film has a function of mirror surface in a mirror surface part 601 of a mirror 600 shown in FIG. 19 may be weaker than the bonding power of the bonding enhancement film 408 to the flat member 401 (see FIGS. 14 and 15). For this reason, when the bonding position of the mirror with respect to the optical housing is a bonding position 602 which is separate from both the mirror surface part and the end portion of the mirror and corresponds to the central portion therebetween, the bonding power of the bonding enhancement film 408 to the flat member 401 is strong. Therefore, preferable is a method for attaching a mirror to an optical housing in which an adhesive material is applied on an area at the bonding position 602 which is at the opposite side of a holding member attaching side 600a, that is, at the side of bonding fixation 600. Thus, an area for measuring a contact angle can be retained on the end portion 603 of the mirror. When an adhesive material is applied on one or two points on the binding position 602, a better strength of bonding fixation can be obtained.

In the mirror manufactured in this embodiment, a bonding position is provided near the center of a transmission part which is separate from the border of a mirror surface part and is not included in an area for measuring a contact angle, and one or two points in the bonding position are positions for application of an adhesive material. Accordingly, a UV curable adhesive material well spreads by wetting thereof, whereby a high bonding strength is obtained after curing the adhesive material, and accordingly, a highly precise optical scanning device can be provided since it can be resistant to a temperature change or the influence of external disturbance such as an impact and vibration and stabilize the optical characteristics thereof.

The twenty-first embodiment of the present invention is an optical scanning device in which the mirror described in the eighteenth or nineteenth embodiment is attached to a housing by the mirror attaching method described in the twentieth embodiment. Due to the optical scanning device according to this embodiment, an inexpensive and highly precise optical scanning device can be provided without complicating a device for binding and fixing a mirror or the configuration or mechanism of components thereof.

Furthermore, the twenty-second embodiment of the present invention is an image forming apparatus in which the optical scanning device according to the twenty-first embodiment is installed. Due to the image forming apparatus in which the optical scanning device is installed, a high-quality image can be obtained.

The twenty-third embodiment of the present invention is a housing of an optical scanning device with a mirror, wherein a bonding part for bonding a mirror has a convex-concave structure having a first surface contacting a bonding surface of a mirror and a second surface which is inclined by 30 to 90 degrees with respect to the bonding surface of the mirror.

Figure 27:
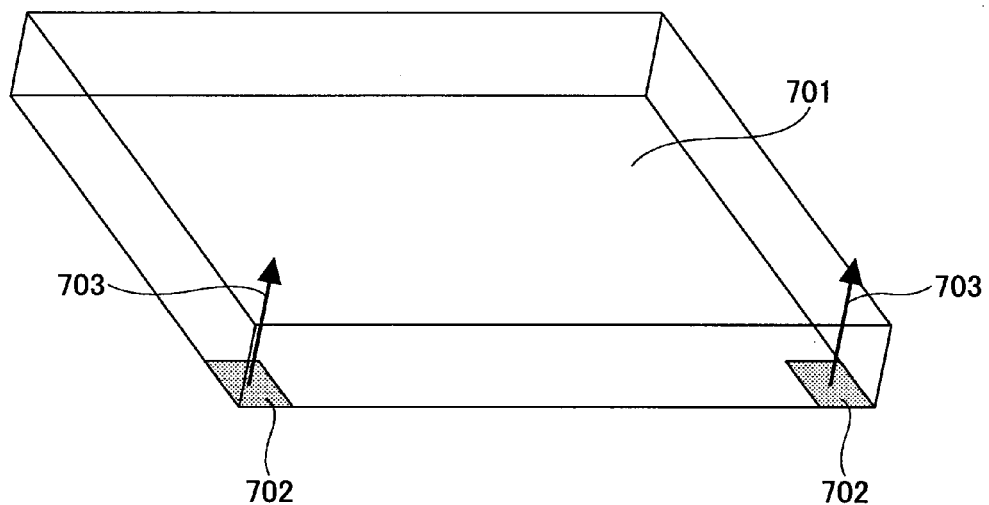
FIG. 27 is a diagram illustrating an impact on a receiving surface of a housing.
Figure 28:
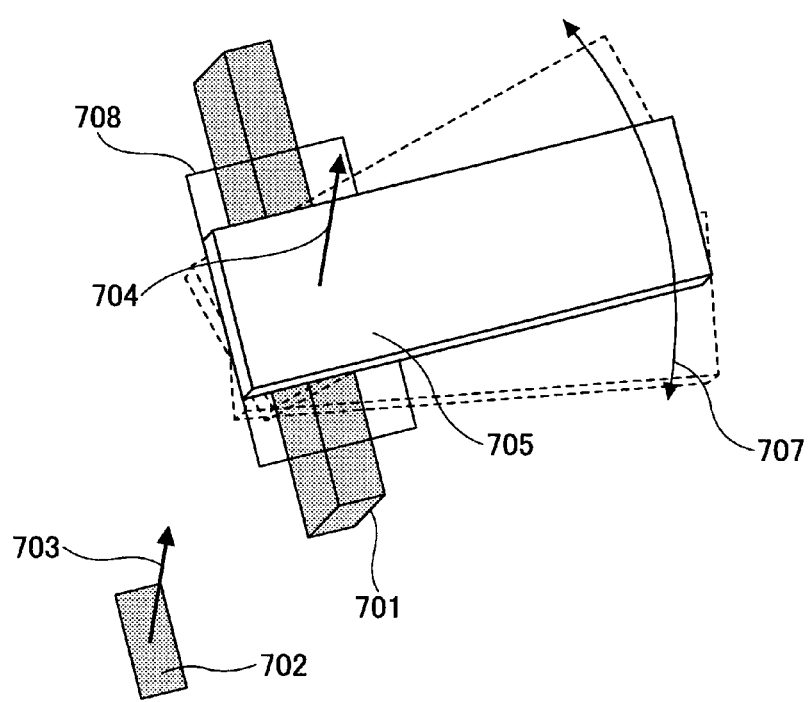
FIG. 28 is a diagram illustrating an impact caused by mirror vibration.

In a mirror housing in which one end of a mirror is bonded by an adhesive material and the other end thereof is fixed with respect to only the directions perpendicular to a mirror surface by a holding mechanism, an impact 703 onto a housing 701 is caused by contacting a product with a receiving surface of the housing 701 at the time of attachment of the housing 701, and thereby, a load in the same directions as those of the impact 703 is applied on a bonding surface of the housing 701, as shown in a perspective view of FIG. 27. Also, as shown in FIG. 28, one end portion of a mirror 705 in the longitudinal directions thereof is only pressurized to the housing 701 by a holding mechanism in order to adjust the direction of reflection of the mirror 705 and is not bounded in the directions parallel to a mirror surface. Accordingly, the mirror swings toward the directions parallel to the mirror surface at the bonding part of the mirror which is an adjustment bonding mechanism 708, as a supporting point, due to an impact 704 from the outside onto the mirror, and thereby, a stress is applied to the bonding part which is caused by the swing 707 of the mirror. Due to the housing 701 according to this embodiment, the mirror 705 is rigidly bonded to the housing 701 against the stress.

Conventionally, a method for extending a space for bonding fixation has been examined in order to improve the bonding strength of a housing and adhesive material. In this method, it is necessary to extend an area irradiated with UV rays for curing a UV curable adhesive material. Therefore, the UV irradiance per unit area is reduced and it takes a long time to cure the adhesive material, so that it provides a disadvantage of cost increase caused by an increase of a tact time at the time of production.

Figure 21:
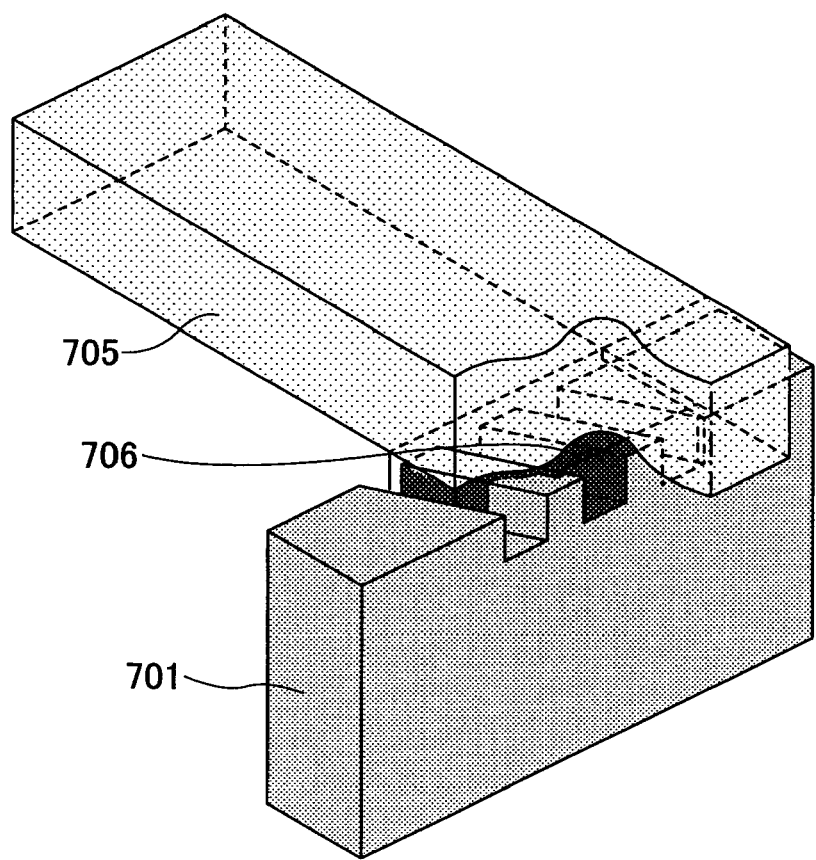
FIG. 21 is a perspective view illustrating a joint part for a mirror and a housing.
Figure 22A:
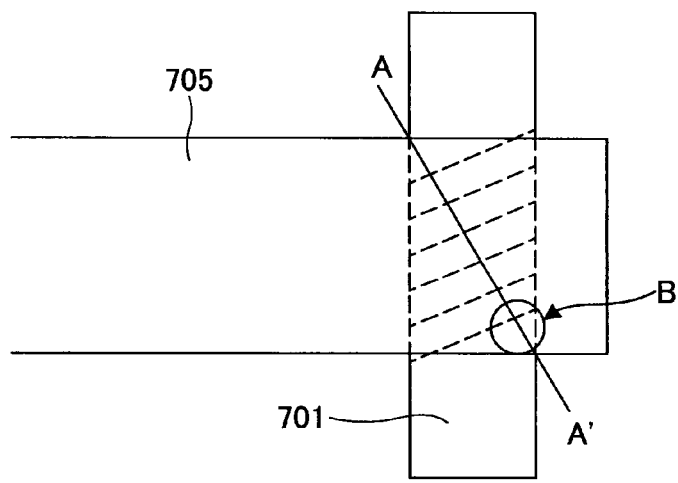
FIGS. 22A, 22B and 22C are diagrams illustrating a joint part for a mirror and a housing.
Figure 22B:
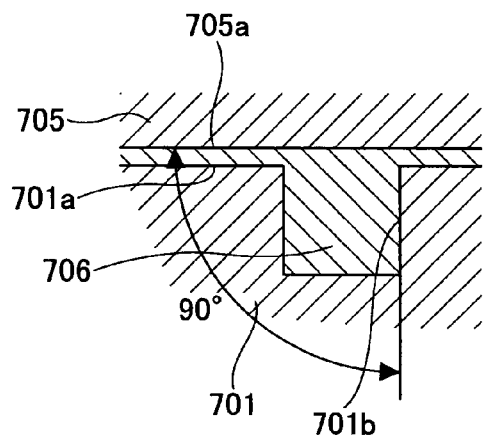
Figure 22C:
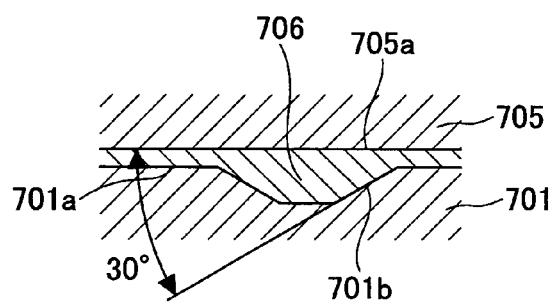

FIG. 21 is a perspective view illustrating a jointing part of a mirror and housing and FIGS. 22B and 22C shows the cross-sectional shape of the jointing part. In this embodiment, a first surface 701a which is a planar surface that is generally parallel to a mirror surface 705a and a second surface 701b making an angle of 30 to 90 degrees with respect to the bonding surface 705a of the mirror are combined such that a bonding part 706 of a housing 701 has a convex-concave shape. FIG. 22B shows an example such that the second surface 701b makes an angle of 90 degrees and FIG. 22A shows an example such that the second surface 701b makes an angle of 30 degrees. Additionally, FIG. 22A is a plan view of a jointing part of a mirror and housing and FIGS. 22Ba and 22C are detailed diagrams of an A-A' cross section of a part B of the jointing part. In the example shown in FIG. 22A, a convex-concave shape including three similar concave recesses and two convex portions is provided.

As the bonding part 706 of the housing 701 has such a convex-concave structure, the bonding area of the housing is extended so as to increase its bonding power with an adhesive material. As the surface of the housing 701 which contacts with the mirror 705 is a surface that is generally parallel to the bonding surface 705a of the mirror, the mirror 705 can be supported by the housing 701 even before application or curing of an adhesive material, whereby the orientation of the mirror 705 at the time of holding the mirror 705 is stable and working with a jig becomes easy. Furthermore, the resistance to peeling of the bonding surface which is caused by a stress in the directions of the mirror surface of the mirror 705 can be increased by having a concave portion. The greater the angle between the first surface 701a and the second surface 701b is, the higher the resistance is, but it may become difficult to conduct filling with an adhesive material or it may become easy to provide a portion in which it is difficult to conduct ultraviolet ray irradiation. Therefore, it is necessary to change the angle of a second surface 701b depending on the adhesive material, the material of the housing 701, the directions of an applied impact, and the degree of the impact. Also, as plural concave and convex portions are arranged on the bonding surface, the bonding strength against the impact can be improved and a function of stopping a progression of peeling can be obtained by a stepwise shape.

The adhesive material is cured on the condition that the adhesive material is introduced to the bottom of the convex-concave shape and the housing 701 and the adhesive material are engaged to each other, wherein it is intended to improve the bonding strength against the swing in the directions parallel to the bonding surface 705a of the mirror and improve the impact resistance. Also, when the depths of the convex-concave shapes are provided uniformly, even the bottom surface of each convex-concave shape can be uniformly irradiated with an ultraviolet ray. Herein, due to an impact applied on the housing 701, the bonding strength at the border(s) of bonding of the housing 701 may be weak against the swing in the directions parallel to the bonding surface 705a of the mirror cantered on an adjustment bonding mechanism of the mirror 705. Therefore, a bonding configuration which is strong against the directions of the swing can be provided by curing the adhesive material into an engaging shape while the bonding strength of the border of bonding is improved.

Figure 23:
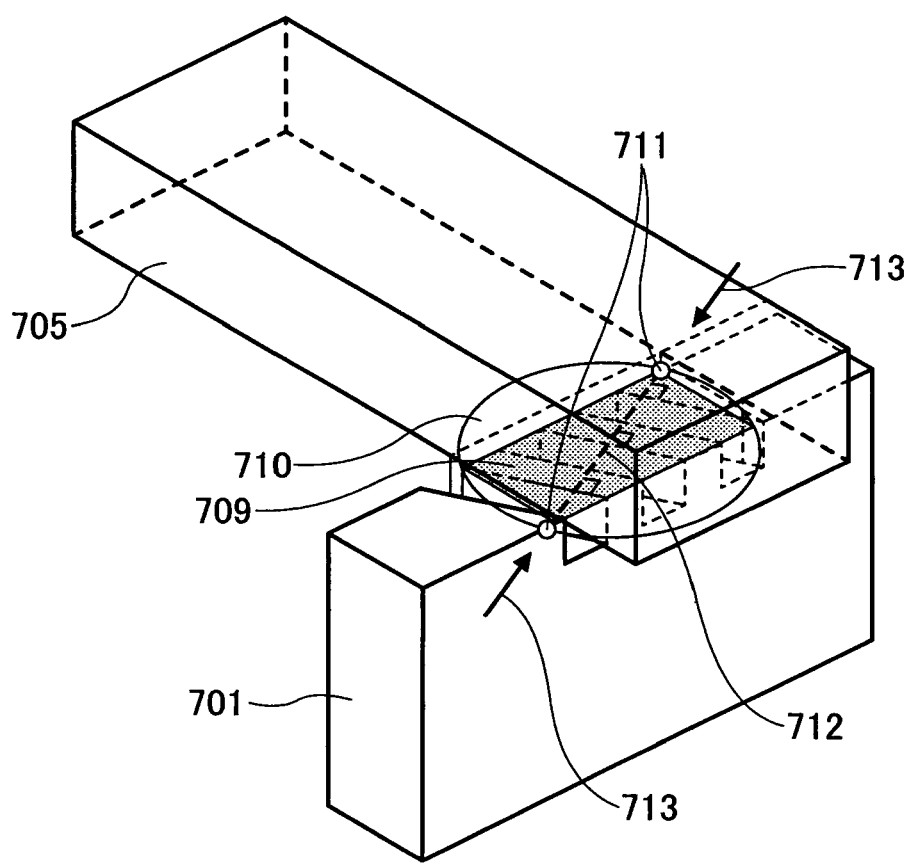
FIG. 23 is a perspective view (1) of a joint part for a mirror and a housing.
Figure 24:
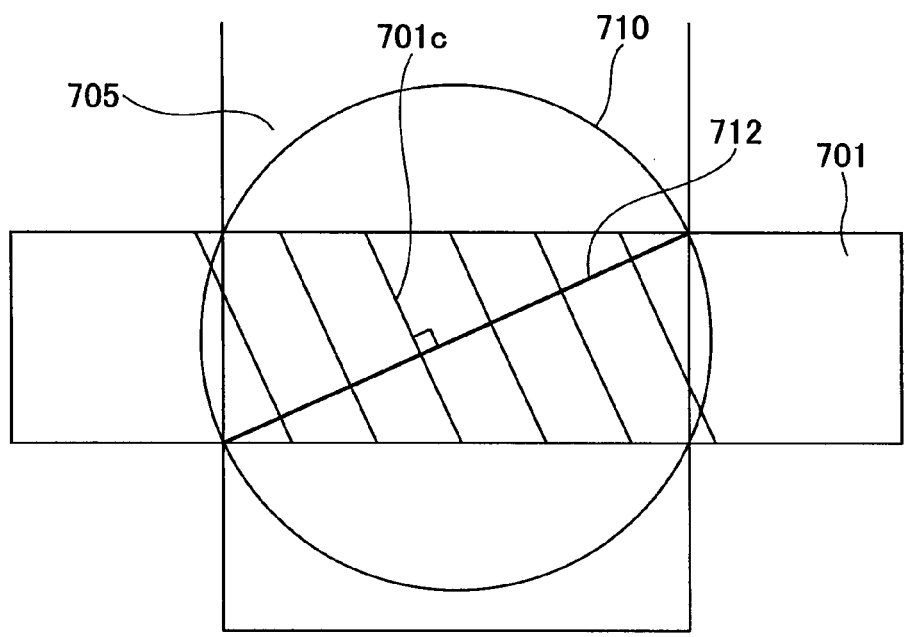
FIG. 24 is a plan view (1) of a joint part for a mirror and a housing.

Furthermore, as shown in FIGS. 23 and 24, an intersectional line 701c of the first surface and second surface of the convex-concave shape of the housing 701 is orthogonal to a straight line connecting points 711 in a bonding area 709 which points are present on a circumscribed circle 710 of the bonding area and are most distant from each other, whereby the progression of peeling of the mirror 705 which peeling starts from corner portions 711 of a rectangle in the bonding area 709 which portions are most distant from each other can be stopped by an adhesive material filling the recess in the concave portion formed perpendicularly to the directions of progression of the peeling. That is, due to an impact applied on the housing 701, the bonding surface is twisted toward the diagonal directions thereof by the swing in the directions parallel to the mirror surface centered on an adjustment bonding mechanism for the mirror 705 and distortion of the mirror 705. As a recess orthogonal to the twist is formed on the bonding surface, the bonding strength can be intently improved by increasing the surface area of the bonding surface in the directions orthogonal to the twist.

Such a convex-concave structure can be easily formed by manufacturing a housing 701 or a rib of the housing while a mold is used and by transcribing a mold pattern with a convex-concave portion corresponding to that of the mirror 705 and bonding part 706. In other manufacturing methods, the convex-concave pattern of the mold is transcribed on the bonding surface whereby working cost for applying an additional process on a molded object can be reduced.

Figure 25:
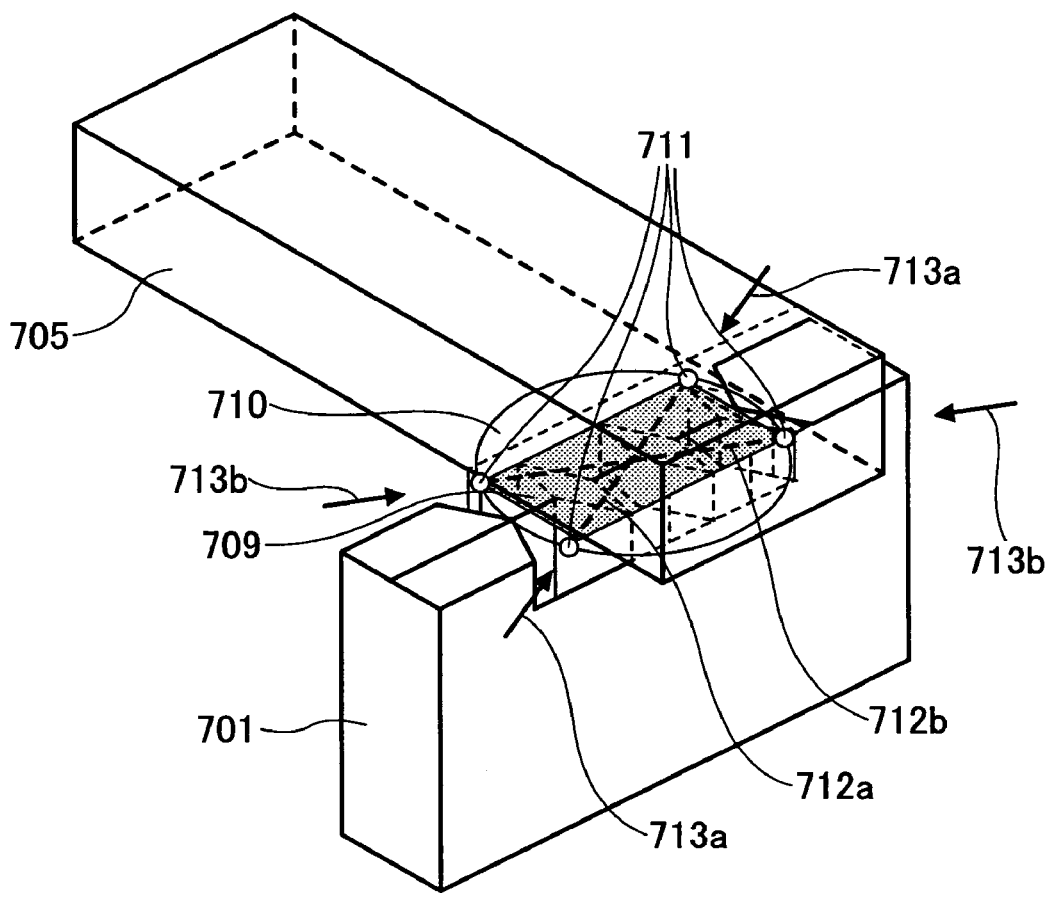
FIG. 25 is a perspective view (2) of a joint part for a mirror and a housing.
Figure 26:
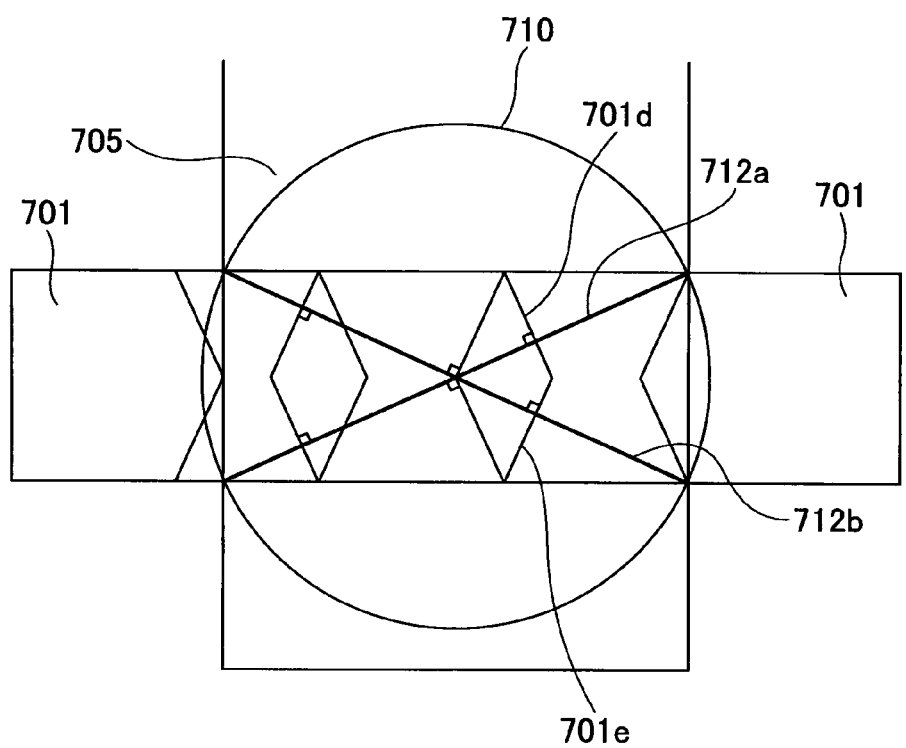
FIG. 26 is a plan view (2) of a joint part for a mirror and a housing.

The twenty-fourth embodiment of the present invention is the housing according to the twenty-third embodiment, wherein the shape of a convex portion of the bonding part is a knurl shape which has an intersection on the bonding surface. As shown in the perspective view of FIG. 25 and the plan view of FIG. 26, in this case, the entire of bonding area 709 also has a rectangular shape, intersectional lines 701d, 701e of the first surface and second surface, that is, the border lines of a convex portion and concave portion in the plan view of FIG. 26 perpendicularly intersect the two diagonal lines 712a, 712b of a rectangular bonding area. On the bonding surface of the housing 701 according to this embodiment, there are two combinations of portions which are present on the circumscribed circle of the bonding area and are most separated from each other, and accordingly, a convex-concave shape corresponding to both of them is provided.

In this case, since the recess is perpendicular to the progression directions 713b of peeling which is caused by, for example, distortion of the mirror 705, an adhesive material filling the recess can also stop the progression of peeling strongly. Due to an impact applied on the housing 701, the bonding surface is twisted toward the diagonal directions thereof by the swing in the directions parallel to the mirror surface centered on an adjustment bonding mechanism for the mirror 705 and distortion of the mirror 705. As a recess orthogonal to the twist is formed on the bonding surface, the bonding strength can be intently improved by increasing the surface area of the bonding surface in the directions orthogonal to the twist.

The twenty-fifth embodiment of the present invention is an optical scanning device in which a mirror is attached to the housing described in the twenty-third or twenty-fourth embodiment. Due to the optical scanning device according to this embodiment, an inexpensive and highly precise optical scanning device can be provided while bonding fixation of a mirror is rigid.

Furthermore, the twenty-sixth embodiment of the present invention is an image forming apparatus in which the optical scanning device according to the twenty-fifth embodiment is installed. Due to the image forming apparatus in which the optical scanning device is installed, a high-quality image can be obtained.

The preferred embodiments of the present invention can be applied to an optical scanning device used in, for example, a digital copying machine or a laser printer. Also, the preferred embodiments of the present invention can be applied to an optical scanning device in which the control of tilt of a scanning line toward sub-scanning directions and the resist deviation in the sub-scanning directions can be conducted simultaneously without providing an adjustment mechanism for the optical scanning device and which is further robust against an environmental change (or is heat-resistant and vibration-resistant).

APPENDIX

Typical embodiments (1) to (49) of the present invention are described below.

Embodiment (1) is an optical scanning device configured to irradiate an object with light generating from a light source via at least one mirror with a first end portion and second end portion which are attached to a housing and to scan the object with the irradiating light, characterized in that the first end portion of the at least one mirror is movably supported by the housing and the second end portion of the at least one mirror is bonded to the housing.

Embodiment (2) is the optical scanning device as described in embodiment (1) above, characterized in that the housing has a convex portion and the first end portion of the at least one mirror is supported by one point on the convex portion.

Embodiment (3) is the optical scanning device as described in embodiment (2) above, characterized in that the convex portion has a curved surface and the first end portion of the at least one mirror is supported by one point on the curved surface of the convex portion.

Embodiment (4) is the optical scanning device as described in any of embodiments (1) to (3) above, characterized by comprising an elastic fixation member configured to fix the first end portion of the at least one mirror on the housing.

Embodiment (5) is an image forming apparatus configured to form an image by using an optical scanning device, characterized in that the optical scanning device is an optical scanning device as described in any of embodiments (1) to (4).

Embodiment (6) is a mirror capable of being bonded by an adhesive material, characterized by having a film configured to improve a bonding power of an adhesive material.

Embodiment (7) is the mirror as described in embodiment (6) above, characterized in that the film is a film configured to improve a reflectance of a mirror surface of a mirror.

Embodiment (8) is the mirror as described in embodiment (6) or (7) above, characterized in that the film comprises a $SiO_2$ layer.

Embodiment (9) is the mirror as described in any of embodiments (6) to (8) above, characterized by having a portion capable of transmitting an ultraviolet ray.

Embodiment (10) is a mirror configured to be arranged in an optical scanning device, characterized by being provided with a mirror surface portion configured to reflect light and be at a center portion thereof and transmission portions configured to transmit light and be at both end portions thereof, and being capable of being bonded to a housing by an adhesive material.

Embodiment (11) is the mirror as described in embodiment (10) above, characterized in that the transmission portions are capable of transmitting an ultraviolet ray.

Embodiment (12) is the mirror as described in embodiment (10) or (11) above, characterized in that a bonding surface is formed on the transmission portion.

Embodiment (13) is the mirror as described in embodiment (12) above, characterized in that the bonding surface is provided as a bonding surface which is a flat surface at a side at which an end portion thereof is smooth.

Embodiment (14) is the mirror as described in embodiment (12) or (13) above, characterized in that the bonding surface has a hydrophilic property.

Embodiment (15) is the mirror as described in embodiment (14) above, characterized in that the bonding surface is provided with a bonding enhancement film configured to improve a bonding power of a mirror.

Embodiment (16) is the mirror as described in embodiment (14) or (15) above, characterized in that the bonding enhancement film is a reflection improving film configured to increase a reflectance of a mirror surface portion.

Embodiment (17) is the mirror as described in embodiment (16) above, characterized in that the reflection improving film comprises a $SiO_2$ layer.

Embodiment (18) is the mirror as described in any of embodiments (12) to (17) above, characterized in that the bonding surface is provided with an area on which an ultraviolet ray-curable adhesive material is applied and an area on which a hydrophilic property thereof is measured.

Embodiment (19) is the mirror as described in embodiment (18) above, characterized in that the area on which a hydrophilic property thereof is measured is arranged at a side of a mirror end portion.

Embodiment (20) is a housing of an optical scanning device with a mirror, characterized in that a bonding part to which a mirror is bonded has a convex-concave form and has a first surface configured to contact a bonding surface of a mirror and a second surface configured to intersect the first surface and form a concave portion, and an intersectional line of the first surface and second surface is generally orthogonal to at least one straight line connecting portions of a bonding surface of a mirror for a housing which portions are most distant from each other.

Embodiment (21) is the housing as described in embodiment (20) above, characterized in that the second surface configured to form the convex-concave shape has an inclination angle of 30 to 90 degrees with respect to the first surface.

Embodiment (22) is the housing as described in embodiment (20) or (21) above, characterized in that depths of concave portions of the convex-concave shape are uniform.

Embodiment (23) is the housing as described in any of embodiments (20) to (22) above, characterized in that the convex-concave shape is formed by transcription of a mold pattern.

Embodiment (24) is a housing of an optical scanning device with a mirror, characterized in that a bonding part to which a mirror is bonded forms a convex-concave shape by a first surface configured to contact a bonding surface of a mirror and a second surface configured to intersect the first surface, and the convex-concave shape has a knurl shape.

Embodiment (25) is the housing as described in embodiment (24) above, characterized in that an intersectional line of the first surface and second surface is generally orthogonal to a straight line connecting portions of a bonding surface of a mirror for a housing which portions are most distant from each other.

Embodiment (26) is the housing as described in embodiment (24) or (25) above, characterized in that the second surface has an inclination angle of 30 to 90 degrees with respect to the first surface.

Embodiment (27) is the housing as described in any of embodiments (24) to (26) above, characterized in that depths of concave portions which form the knurl shape are uniform.

Embodiment (28) is the housing as described in any of embodiments (24) to (27) above, characterized in that the knurl shape is formed by transcription of a mold pattern.

Embodiment (29) is an optical scanning device characterized by having a housing as described in any of embodiments (20) to (28) above.

Embodiment (30) is an image forming apparatus characterized in that an optical scanning device as described in embodiment (29) above is installed.

Embodiment (31) is a mirror attaching method configured to attach at least one mirror with a first end portion and a second end portion to a housing of an optical scanning device configured to scan an object with light generating from a light source, characterized in that the first end portion of the at least one mirror is movably attached to the housing and the second end portion of the at least one mirror is attached to the housing by means of adhesion.

Embodiment (32) is the mirror attaching method as described in embodiment (31) above, characterized in that the second end portion of the at least one mirror is bonded to the housing by using an ultraviolet ray-curable adhesive material, an electron beam-curable adhesive material or a thermally curable adhesive material.

Embodiment (33) is the mirror attaching method as described in embodiment (31) above, characterized in that attachment of the second end portion of the at least one mirror to the housing by means of adhesion comprises bonding of the second end portion of the at least one mirror to the housing by using an adhesive material, and the second end portion of the at least one mirror is bonded to the housing so that there is no deformation of the adhesive material in directions of a normal line of a bonding surface of the second end portion of the at least one mirror or a deformation rate of the adhesive material in directions of a normal line of the bonding surface is less than a deformation rate of the adhesive material in directions orthogonal to the normal line of the bonding surface.

Embodiment (34) is the mirror attaching method as described in embodiment (33) above, characterized in that energy for curing the adhesive material is applied to the adhesive material so that energy for curing the adhesive material is not applied in directions of the normal line of the bonding surface or energy for curing the adhesive material which is applied in directions of the normal line of the bonding surface is less than energy for curing the adhesive material which is applied in directions orthogonal to the normal line of the bonding surface.

Embodiment (35) is the mirror attaching method as described in embodiment (34) above, characterized in that the energy for curing the adhesive material is applied to the adhesive material in directions orthogonal to the normal line of the bonding surface.

Embodiment (36) is the mirror attaching method as described in any of embodiments (33) to (35) above, characterized in that the adhesive material is selected from the group consisting of ultraviolet ray-curable adhesive materials, electron beam-curable adhesive materials, and thermally curable adhesive materials.

Embodiment (37) is the mirror attaching method as described in embodiment (36) above, characterized in that the adhesive material is an ultraviolet ray-curable adhesive material.

Embodiment (38) is a mirror attaching method configured to moveably attach a first end portion side of a mirror as described in any of embodiments (10) to (19) above to a housing and attach a second end portion side thereof to a housing by means of adhesion, characterized in that a position of bonding of a mirror is generally center portion between an end portion of a mirror in longitudinal directions thereof and an end portion of a mirror surface portion which end portions are at a side of the second end portion.

Embodiment (39) is the mirror attaching method as described in embodiment (38) above, characterized in that an adhesive material is applied on one point or two points on the position of bonding.

Embodiment (40) is an optical scanning device characterized in that a mirror is attached to a housing by a mirror attaching method as described in embodiment (38) or (39) above.

Embodiment (41) is an image forming apparatus characterized in that an optical scanning device as described in embodiment (40) above is installed.

Embodiment (42) is a mirror arrangement adjusting device configured to adjust arrangement of a mirror attached to a housing of an optical scanning device configured to scan an object with light generating from a light source, characterized by comprising a device configured to rotate the mirror around a first rotational axis of the mirror.

Embodiment (43) is the mirror arrangement adjusting device as described in embodiment (42) above, characterized by further comprising a device configured to rotate the mirror around a second axis of the mirror which is orthogonal to the first rotational axis.

Embodiment (44) is the mirror arrangement adjusting device as described in embodiment (42) or (43) above, characterized in that the mirror is a mirror on which an adhesive material is applied and the device further comprises a device configured to cure the adhesive material.

Embodiment (45) is the mirror arrangement adjusting device as described in any of embodiments (42) to (44) above, characterized by further comprising a device configured to detect variation of arrangement of the mirror which is caused by curing of the adhesive material.

Embodiment (46) is a mirror arrangement adjusting method configured to adjust arrangement of a mirror attached to a housing of an optical scanning device configured to scan an object with light generating from a light source, characterized by comprising rotating of the mirror around a first rotational axis of the mirror.

Embodiment (47) is the mirror arrangement adjusting method as described in embodiment (46) above, characterized by further comprising rotating of the mirror around a second axis of the mirror which is orthogonal to the first rotational axis.

Embodiment (48) is the mirror arrangement adjusting method as described in embodiment (46) or (47) above, characterized in that the mirror is a mirror on which an adhesive material is applied and the device further comprises curing of the adhesive material.

Embodiment (49) is the mirror arrangement adjusting method as described in any of embodiments (46) to (48) above, characterized by further comprising detecting of a variation of arrangement of the mirror which is caused by curing of the adhesive material.

According to at least one of the typical embodiments (1) to (49) of the present invention, it makes possible to provide at least one of, an optical scanning device which is capable of adjusting arrangement of a mirror and in which a mirror distortion caused by heat is reduced, an image forming apparatus which comprises the optical scanning device, a mirror which is capable of being bonded rigidly and more easily, a housing which is capable of bonding a mirror thereto rigidly, a mirror attaching method which is capable of adjusting arrangement of a mirror and in which a mirror distortion caused by heat is reduced, a mirror arrangement adjusting device which is capable of adjusting arrangement of a mirror more easily, and a mirror arrangement adjusting method which is capable of adjusting arrangement of a mirror more easily.

Although the embodiment(s) and specific example(s) of the present invention have been specifically described above, the present invention is not limited to the embodiment(s) or specific example(s) and the embodiment(s) and specific example(s) of the present invention can be altered or modified without departing from the spirit and scope of the present invention.

The present application is based on Japanese priority application No. 2006-272976 filed on Oct. 4, 2006, Japanese priority application No. 2007-077762 filed on Mar. 23, 2007, and Japanese priority application No. 2007-192154 filed on Jul. 24, 2007, the entire contents of which priority applications are hereby incorporated by reference.

[List of Claim Candidates]

(1) An optical scanning device configured to irradiate an object with light generating from a light source via at least one mirror with a first end portion and second end portion which are attached to a housing and to scan the object with the irradiating light, wherein the first end portion of the at least one mirror is movably supported by the housing and the second end portion of the at least one mirror is bonded to the housing.

(2) The optical scanning device as described in (1) above, wherein the housing has a convex portion and the first end portion of the at least one mirror is supported by one point on the convex portion.

(3) The optical scanning device as described in (2) above, wherein the convex portion has a curved surface and the first end portion of the at least one mirror is supported by one point on the curved surface of the convex portion.

(4) The optical scanning device as described in (1) above, which comprises an elastic fixation member configured to fix the first end portion of the at least one mirror on the housing.

(5) An image forming apparatus configured to form an image by using an optical scanning device, wherein the optical scanning device is an optical scanning device as described in (1) above.

(6) A mirror capable of being bonded by an adhesive material, which has a film configured to improve a bonding power of an adhesive material.

(7) The mirror as described in (6) above, wherein the film is a film configured to improve a reflectance of a mirror surface of a mirror.

(8) The mirror as described in (6) above, wherein the film comprises a $SiO_2$ layer.

(9) The mirror as described in (6) above, which has a portion capable of transmitting an ultraviolet ray.

(10) A mirror configured to be arranged in an optical scanning device, which is provided with a mirror surface portion configured to reflect light and be at a center portion thereof and transmission portions configured to transmit light and be at both end portions thereof, and which is capable of being bonded to a housing by an adhesive material.

(11) The mirror as described in (10) above, wherein the transmission portions are capable of transmitting an ultraviolet ray.

(12) The mirror as described in (10) above, wherein a bonding surface is formed on the transmission portion.

(13) The mirror as described in (12) above, wherein the bonding surface is provided as a bonding surface which is a flat surface at a side at which an end portion thereof is smooth.

(14) The mirror as described in (12) above, wherein the bonding surface has a hydrophilic property.

(15) The mirror as described in (14) above, wherein the bonding surface is provided with a bonding enhancement film configured to improve a bonding power of a mirror.

(16) The mirror as described in (14) above, wherein the bonding enhancement film is a reflection improving film configured to increase a reflectance of a mirror surface portion.

(17) The mirror as described in (16) above, wherein the reflection improving film comprises a $SiO_2$ layer.

(18) The mirror as described in (12) above, wherein the bonding surface is provided with an area on which an ultraviolet ray-curable adhesive material is applied and an area on which a hydrophilic property thereof is measured.

(19) The mirror as described in (18) above, wherein the area on which a hydrophilic property thereof is measured is arranged at a side of a mirror end portion.

(20) A housing of an optical scanning device with a mirror, wherein a bonding part to which a mirror is bonded has a convex-concave form and has a first surface configured to contact a bonding surface of a mirror and a second surface configured to intersect the first surface and form a concave portion, and an intersectional line of the first surface and second surface is generally orthogonal to at least one straight line connecting portions of a bonding surface of a mirror for a housing which portions are most distant from each other.

(21) The housing as described in (20) above, wherein the second surface has an inclination angle of 30 to 90 degrees with respect to the first surface.

(22) The housing as described in (20) above, wherein depths of concave portions of the convex-concave shape are uniform.

(23) The housing as described in (20) above, wherein the convex-concave shape is formed by transcription of a mold pattern.

(24) A housing of an optical scanning device with a mirror, wherein a bonding part to which a mirror is bonded forms a convex-concave shape by a first surface configured to contact a bonding surface of a mirror and a surface configured to contain a second surface configured to intersect the first surface, and the convex-concave shape has a knurl shape.

(25) The housing as described in (24) above, wherein an intersectional line of the first surface and second surface is generally orthogonal to a straight line connecting portions of a bonding surface of a mirror for a housing which portions are most distant from each other.

(26) The housing as described in (24) above, wherein the second surface has an inclination angle of 30 to 90 degrees with respect to the first surface.

(27) The housing as described in (24) above, wherein depths of concave portions which form the knurl shape are uniform.

(28) The housing as described in (24) above, wherein the knurl shape is formed by transcription of a mold pattern.

(29) An optical scanning device which has a housing as described in (20) above.

(30) An image forming apparatus wherein an optical scanning device as described in (29) above is installed.

(31) A mirror attaching method configured to attach at least one mirror with a first end portion and a second end portion to a housing of an optical scanning device configured to scan an object with light generating from a light source, wherein the first end portion of the at least one mirror is movably attached to the housing and the second end portion of the at least one mirror is attached to the housing by means of adhesion.

(32) The mirror attaching method as described in (31) above, wherein the second end portion of the at least one mirror is bonded to the housing by using an ultraviolet ray-curable adhesive material, an electron beam-curable adhesive material or a thermally curable adhesive material.

(33) The mirror attaching method as described in (31) above, wherein attachment of the second end portion of the at least one mirror to the housing by means of adhesion comprises bonding of the second end portion of the at least one mirror to the housing by using an adhesive material, and the second end portion of the at least one mirror is bonded to the housing so that there is no deformation of the adhesive material in directions of a normal line of a bonding surface of the second end portion of the at least one mirror or a deformation rate of the adhesive material in directions of a normal line of the bonding surface is less than a deformation rate of the adhesive material in directions orthogonal to the normal line of the bonding surface.

(34) The mirror attaching method as described in (33) above, wherein energy for curing the adhesive material is applied to the adhesive material so that energy for curing the adhesive material is not applied in directions of the normal line of the bonding surface or energy for curing the adhesive material which is applied in directions of the normal line of the bonding surface is less than energy for curing the adhesive material which is applied in directions orthogonal to the normal line of the bonding surface.

(35) The mirror attaching method as described in (34) above, wherein the energy for curing the adhesive material is applied to the adhesive material in directions orthogonal to the normal line of the bonding surface.

(36) The mirror attaching method as described in (33) above, wherein the adhesive material is selected from the group consisting of ultraviolet ray-curable adhesive materials, electron beam-curable adhesive materials, and thermally curable adhesive materials.

(37) The mirror attaching method as described in (36) above, wherein the adhesive material is an ultraviolet ray-curable adhesive material.

(38) A mirror attaching method configured to moveably attach a first end portion side of a mirror as described in any of (10) to (19) above in longitudinal directions thereof to a housing and attach a second end portion side thereof to a housing by means of adhesion, wherein a position of bonding of a mirror is generally center portion between an end portion of a mirror in longitudinal directions thereof and an end portion of a mirror surface portion which end portions are at a side of the second end portion.

(39) The mirror attaching method as described in (38) above, wherein an adhesive material is applied on one point or two points on the position of bonding.

(40) An optical scanning device, wherein a mirror is attached to a housing by a mirror attaching method as described in (38) above.

(41) An image forming apparatus, wherein an optical scanning device as described in (40) above is installed.

(42) A mirror arrangement adjusting device configured to adjust arrangement of a mirror attached to a housing of an optical scanning device configured to scan an object with light generating from a light source, which comprises a device configured to rotate the mirror around a first rotational axis of the mirror.

(43) The mirror arrangement adjusting device as described in (42) above, which further comprises a device configured to rotate the mirror around a second axis of the mirror which is orthogonal to the first rotational axis.

(44) The mirror arrangement adjusting device as described in (42) above, wherein the mirror is a mirror on which an adhesive material is applied and the device further comprises a device configured to cure the adhesive material.

(45) The mirror arrangement adjusting device as described in (42) above, which further comprises a device configured to detect variation of arrangement of the mirror which is caused by curing of the adhesive material.

(46) A mirror arrangement adjusting method configured to adjust arrangement of a mirror attached to a housing of an optical scanning device configured to scan an object with light generating from a light source, which comprises rotating of the mirror around a first rotational axis of the mirror.

(47) The mirror arrangement adjusting method as described in (46) above, which further comprises rotating of the mirror around a second axis of the mirror which is orthogonal to the first rotational axis.

(48) The mirror arrangement adjusting method as described in (46) above, wherein the mirror is a mirror on which an adhesive material is applied and the device further comprises curing of the adhesive material.

(49) The mirror arrangement adjusting method as described in (46) above, which further comprises detecting of a variation of arrangement of the mirror which is caused by curing of the adhesive material.

What is claimed is:

1. An optical scanning device comprising:
   a light source that generates light;
   at least one mirror that scans an object by irradiating the object with the light, the at least one mirror including a first end portion and second end portion at respective opposite ends of the at least one mirror in a main scanning direction; and
   a housing that contains the light source and at least one mirror,
   wherein the at least one mirror includes an upper surface and a lower surface,
   wherein the first end portion of the at least one mirror is movably supported by the housing,
   wherein the lower surface of the at least one mirror, at the second end portion, is bonded to the housing, and
   wherein the upper surface includes a UV transmission part that corresponds to a bonding surface included on the lower surface, such that UV radiation applied to the upper surface of the at least one mirror is transmitted through the a UV transmission part to the bonding surface.

2. The optical scanning device as claimed in claim 1, wherein the housing has a convex portion and the first end portion of the at least one mirror is supported on the lower surface by one point on the convex portion.

3. The optical scanning device as claimed in claim 2, wherein the convex portion has a curved surface and the first end portion of the at least one mirror is supported by one point on the curved surface of the convex portion.

4. The optical scanning device as claimed in claim 2, further comprising:

an elastic fixation member that fixes the first end portion of the at least one mirror on the housing, the elastic fixation member including pressure parts that symmetrically press, with respect to the convex portion, an upper surface of the at least one mirror at the first end portion.

5. An image forming apparatus configured to form an image by using an optical scanning device, wherein the optical scanning device is an optical scanning device as claimed in claim 1.

6. The optical scanning device as claimed in claim 2,
wherein the housing includes a rib that traverses a width of the housing, and
wherein rib includes the convex portion on an upper rib surface.

7. The optical scanning device as claimed in claim 1, wherein the lower surface includes a mirror surface that reflects the light, and
wherein the bonding surface includes a bonding enhancement film that enhances the bonding between the at least one mirror and a UV curable adhesive material.

* * * * *